US012733008B2

(12) United States Patent
Babaei

(10) Patent No.: US 12,733,008 B2
(45) Date of Patent: Sep. 8, 2026

(54) GROUP NOTIFICATION AND CONFIRMATION FOR MULTICAST BROADCAST SERVICES

(71) Applicant: TOYOTA JIDOSHA KABUSHIKI KAISHA, Toyota (JP)

(72) Inventor: Alireza Babaei, Fairfax, VA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 111 days.

(21) Appl. No.: 18/535,661

(22) PCT Filed: Jun. 9, 2022

(86) PCT No.: PCT/US2022/032763
§ 371 (c)(1),
(2) Date: Dec. 11, 2023

(87) PCT Pub. No.: WO2023/244701
PCT Pub. Date: Dec. 21, 2023

(65) Prior Publication Data

US 2025/0203623 A1 Jun. 19, 2025

Related U.S. Application Data

(60) Provisional application No. 63/209,842, filed on Jun. 11, 2021.

(51) Int. Cl.
*H04W 72/23* (2023.01)
*H04W 4/06* (2009.01)
(Continued)

(52) U.S. Cl.
CPC ............. *H04W 72/23* (2023.01); *H04W 4/06* (2013.01); *H04W 72/30* (2023.01); *H04W 76/40* (2018.02); *H04W 76/27* (2018.02)

(58) Field of Classification Search
CPC ....... H04W 72/23; H04W 4/06; H04W 72/30; H04W 76/27; H04W 76/40
See application file for complete search history.

(56) References Cited

U.S. PATENT DOCUMENTS 6,771,670 B1 8/2004 Pfahler
12,470,897 B2 * 11/2025 Dai ...................... H04W 76/40
(Continued)

FOREIGN PATENT DOCUMENTS

CN 111294789 A 6/2020
EP 2389034 B1 3/2011
(Continued)

OTHER PUBLICATIONS

GPP TSG RAN Meeting #88-e; RP-201038; Revised Work Item on NR Multicast and Broadcast Services (2013); Huwai; Jun. 29, 2020.
(Continued)

*Primary Examiner* — Angela Widhalm De Rodriguez
(74) *Attorney, Agent, or Firm* — Finnegan, Henderson, Farabow, Garrett and Dunner, LLP

(57) ABSTRACT

A method of multicast broadcast services (MBS) notification signaling includes receiving, by a user equipment (UE), a downlink control information (DCI). The DCI is associated with a first radio network temporary identifier (RNTI) corresponding at least to MBS-related notifications and includes a field with a plurality of bits. One or more bits of the plurality of bits of the field indicate an update or a change to one or more MBS-related parameters. The method also includes determining, based on the indication by the one or more bits, to monitor signaling indicating the updated or changed MBS-related parameters and receiving MBS data based on the updated or changed MBS-related parameters.

16 Claims, 23 Drawing Sheets

(51) Int. Cl.

| | |
|---|---|
| ***H04W 72/30*** | (2023.01) |
| ***H04W 76/40*** | (2018.01) |
| *H04W 76/27* | (2018.01) |

(56) References Cited

U.S. PATENT DOCUMENTS

| | | | | |
|---|---|---|---|---|
| 12,574,163 | B2 | 3/2026 | Baek et al. | |
| 2010/0266063 | A1 | 10/2010 | Harel | |
| 2017/0303157 | A1 | 10/2017 | Siomina | |
| 2019/0182632 | A1 | 6/2019 | Fujishiro | |
| 2019/0386771 | A1 | 12/2019 | Liu | |
| 2020/0077458 | A1 | 3/2020 | Stauffer | |
| 2020/0091978 | A1 | 3/2020 | Noh | |
| 2020/0350969 | A1 | 11/2020 | Shimezawa | |
| 2020/0396591 | A1 | 12/2020 | Ou | |
| 2020/0413301 | A1 | 12/2020 | Shi | |
| 2021/0051505 | A1 | 2/2021 | Xu | |
| 2021/0099324 | A1 | 4/2021 | Choi | |
| 2021/0105055 | A1 | 4/2021 | Chae | |
| 2021/0250918 | A1* | 8/2021 | Liu | H04L 1/1812 |
| 2021/0259040 | A1 | 8/2021 | Babaei | |
| 2021/0274525 | A1 | 9/2021 | Wei | |
| 2021/0410180 | A1 | 12/2021 | Tsai | |
| 2022/0046687 | A1* | 2/2022 | Shrivastava | H04W 72/30 |
| 2022/0060923 | A1 | 2/2022 | Zheng | |
| 2022/0159417 | A1 | 5/2022 | Zhou et al. | |
| 2022/0210783 | A1 | 6/2022 | Yeo et al. | |
| 2022/0231818 | A1 | 7/2022 | Lee et al. | |
| 2022/0232403 | A1 | 7/2022 | Lee et al. | |
| 2022/0239428 | A1 | 7/2022 | Lee et al. | |
| 2022/0272662 | A1 | 8/2022 | Kim | |
| 2022/0286818 | A1 | 9/2022 | Chin et al. | |
| 2024/0260134 | A1* | 8/2024 | Babaei | H04W 4/06 |
| 2025/0301282 | A1 | 9/2025 | Babaei | |

FOREIGN PATENT DOCUMENTS

| | | | | |
|---|---|---|---|---|
| EP | 3509343 | A1 | 1/2019 | |
| JP | 2023-518864 | A | 5/2023 | |
| WO | 2015169371 | A1 | 11/2015 | |
| WO | 2016141514 | A1 | 9/2016 | |
| WO | 2016196044 | A1 | 12/2016 | |
| WO | 2017086843 | A1 | 5/2017 | |
| WO | 2018142345 | A1 | 8/2018 | |
| WO | 2020150952 | A1 | 7/2020 | |
| WO | 2020167205 | A1 | 8/2020 | |
| WO | 2020167747 | A1 | 8/2020 | |
| WO | 2022180226 | A1 | 9/2020 | |
| WO | WO 2020/180226 | A1 | 9/2020 | |
| WO | 2020220233 | A1 | 11/2020 | |
| WO | 2020247043 | A1 | 12/2020 | |
| WO | 2021023280 | A1 | 2/2021 | |
| WO | 2021033085 | A1 | 2/2021 | |
| WO | 2021078357 | A1 | 4/2021 | |
| WO | 2021098074 | A1 | 5/2021 | |
| WO | 2021152405 | A1 | 8/2021 | |
| WO | 2021163527 | A1 | 8/2021 | |
| WO | WO 2021/190648 | A1 | 9/2021 | |
| WO | 2021228406 | A1 | 11/2021 | |
| WO | 2021242157 | A1 | 12/2021 | |
| WO | WO 2022/065495 | A1 | 3/2022 | |
| WO | WO-2022057173 | A1 * | 3/2022 | H04W 4/06 |
| WO | 2022078804 | A1 | 4/2022 | |
| WO | 2022082727 | A1 | 4/2022 | |
| WO | WO 2022/109249 | A1 | 5/2022 | |
| WO | WO 2023/244701 | A1 | 12/2023 | |

OTHER PUBLICATIONS

3GPP TS 36.300; 3rd Generation Partnership Project; Technical Specification Group Radio Access Network; NR; Radio Resource Control (RRC) protocol specification (Release 16) (Jun. 2021).

3GPP TS 38.331;3rd Generation Partnership Project; Technical Specification Group Radio Access Network; NR; Medium Access Control (MAC) protocol specification (Release 16); (2020-12).

3GPP TSG WG1 Meeting #103-E; Intel Corp., Sidelink Enhancements for UE Power Saving; R1-2008998; Oct. 26, 2020.

3GPP TSG RAN WG1 #106-e; Interdigital Inc .; Sidelink Resourse Allocation for Power Saving; R1-2108035; Aug. 16, 2021.

3GPP TSG RAN WG2 Meeting of #114-e; Report from email discussion [AT114-e][027][QoE] Start and Stop (Lenovo); May 19, 2021.

Scheffel, et al.; WSN Data Confidence Attribution Using Predictors; 2018 Eighth Latin American Symposium on Dependable Computing (LADC); 2018.

3GPP_TS_28_404; 3rd Generation Partnership Project; Technical Solution Group Services and System Aspects; Mar. 27, 2020.

3GPP TSG RAN WG2 Meeting # 114-e; Further Discussion on QoE Measurement Collection in NR Standalone; R2_2105214; May 19, 2021.

3GPP TSG RAN WG2 Meeting # 114; Change Request; R2_2106554; May 19, 2021.

3GPP TSG-RAN WG3 #112-e; ZTE, China Telecom; TP for TS 38.300 Introduce NR QoE; May 17, 2021.

3GPP TR 38.890; Apr. 2021; Study on NR QoE Management and Optimizations for Diverse Services; Release 17; Apr. 9, 2021.

3GPP TSG RAN WG1 #105-e; Feature Lead Summary # 5 on RAN basic functions for broadcast/multicast for UEs in RRC_IDLE/RRC_Inactive States; May 10, 2021.

3GPP YSG-RAN WG2 Meeting #112-e; Qualcomm;NR Multicast-Broadcast Services and Configuration for UEs in Different RRC States; R2_2009038; Nov. 2, 2020.

3GPP YSG-RAN WG2 Meeting #111 Electronic; Scope and Architecture Analysis of Nr Mbs; R2_2007442; Aug. 17, 2020.

3GPP TSG-RAN WG2 Meeting #113e; Futurewei; Discussion on NR MBS Solutions of Mode 2 Delivery; R2-2100631; Jan. 25, 2021.

3GPP TSG-RAN WG2 Meeting #114-e; MBA MAC Layer and Group Scheduling Aspects; R2-2104876; May 19, 2021.

3GPP TSG-RAN WG2 Meeting #113bis electronic; Discussion on QoE Measurement Pausing and Resuming; R2-2103146; Apr. 2021.

3GPP TSG RAN WG1 #102-e Meeting; On Basic Functions for Broadcast/Multicast for RRC_IDLE/RRC_INACTIVE UEs; R1-2006175; Aug. 17, 2020.

3GPP TR 23.757; Study on Architectural Enhancements for 5G Multicast-Broadcast Services (Release 17); Mar. 2021.

3GPP FSG-RAN WG2 Meeting #111 electronic; Overview of NR MBS; R2-20070033; Aug. 18, 2020.

3GPP TSG-RAN WG2 Meeting #113-bis-e; ZTE Corp .; Discussion on Pause/Resume NR QoE Reporting; R2-2104271; Apr. 12, 2021.

3GPP TSG-RAN WG2 Meeting 113bis-e; Multicast Session Reception in RRC INACTIVE; R2-2103907; Apr. 12, 2021.

3GPP TSG RAN WG1 #105-e; Intel Corp.; NR MBS Group Scheduling for RRC_Connected UEs; R1-2104928; May 19, 2021.

3GPP TSG-RAN WG2 Meeting #113bis Electronic; QoE Reporting Control by RAN Awareness on QoE Parameter; R2-2103556; Apr. 12, 2021.

3GPP TSG-RAN WG2 Meeting #112-e; ZTE; Discussion on QoE in NR; R2-2010476; Nov. 2, 2020.

3GPP TSG-RAN WG2 Meeting #112-e; Nokia; Analysis of Solutions for Paging Collision; R2-2009264; Nov. 2, 2020.

3GPP TSG RAN WG2 #113bis; Ericsson; Configuration and Reporting for QoE Management; R2-2103049; Apr. 12, 2021.

3GPP TSG-RAN WG2 Meeting #97; Change Request; R2-1702256; Feb. 13, 2017.

3GPP TSG RAN WG1 Meeting #92bis; Apple; Discussion on Beam Measurement and Reporting; R1-1804770; Apr. 16, 2018.

3GPP TSG-RAN #111-e Qualcomm summary of off line discussion Jan. 25-Feb. 4, 2021.

Notification of transmittal of the ISR and the WO of the ISA mailed Sep. 20, 2022 in PCT/US2022/032763.

R3_212440 3GPP TSG-RAN WG3 #112-e May 17-28, 2021 ZTE.

R2-2103146 3GPP TSG-RAN WG2 Meeting #113bis electronic Apr. 2012 OPPO; Discussion on QoE Measurement Pausing and resuming.

(56) References Cited

OTHER PUBLICATIONS

R2-210271 3gPP TSG RAN WG2 Meeting #113-bis-e Apr. 12, 20 Apr. 2021 ZTE NR QoE Reporting.
R2-2103556 3GPP TSG-RAN WG2 Meeting #113bis electronic NOKIA QoE Reporting Control by RAN Awareness.
R2-2106554 3GPP TSG-RAN WSG Meeting #114 May 19-May 27, 2021 Change Request.
R1-2106218 3GPP TSG RAN WG1—27th, 2012 Moderator (BBC).
R2-2104876 3GPP TSG-RAN WG2 Meeting #114-e May 19-27, 2021 Intel Mabs Mac Layer and Group Scheduling Aspects.
R2-2007033 3GPP TSG-RAN WG2 Meeting #111 electronic Aug. 18-28, 2020 VIVO Overview of NR MBS.
R2-2104928 3GPP TSG WG1 #105-e Intel NR MBS Group Scheduling.
3GPP TSG-RAN WG2 Meeting #112 electronic, "Discussion on Idle and Inactive UE MBS reception," R2-2010387, CMCC, Nov. 2-14, 2020, 4 pages.
3GPP TSG-RAN WG2 Meeting #113-e, "MBS support for delivery mode 2," R2-2101759, Intel Corporation, Jan. 25-Feb. 5, 2021, pp. 1-4.
3GPP TSG RAN WG1 Meeting #105-3, "Basic functions for MBS for RRC_IDLE/RRC_INACTIVE UEs," R2-2105849, Chengdu TD Tech, TD Tech, May 19-27, 2021, pp. 1-6.
Non Final Office Action issued in U.S. Appl. No. 19/438,086, dated May 7, 2026.
Non Final Office Action issued in U.S. Appl. No. 19/483,086, dated May 7, 2026.

* cited by examiner

| Logical channel \ Transport channel | BCH | PCH | DL-SCH |
| --- | --- | --- | --- |
| BCCH | X | | X |
| PCCH | | X | |
| CCCH | | | X |
| DCCH | | | X |
| DTCH | | | X |

FIG. 3A

| Logical channel \ Transport channel | UL-SCH | RACH |
| --- | --- | --- |
| CCCH | X | |
| DCCH | X | |
| DTCH | X | |

FIG. 3B

| Logical channel \ Transport channel | SL-BCH | SL-SCH |
| --- | --- | --- |
| SBCCH | X | |
| SCCH | | X |
| STCH | | X |

FIG. 3C

| Transport channel \ Physical channel | PDSCH | PDCCH | PBCH |
|---|---|---|---|
| BCH | | | X |
| PCH | X | | |
| DL-SCH | X | | |

FIG. 4A

| Transport channel \ Physical channel | PUSCH | PUCCH | PRACH |
|---|---|---|---|
| UL-SCH | X | | |
| RACH | | | X |

FIG. 4B

| Transport channel \ Physical channel | PSSCH | PSCCH | PSFCH | PSBCH |
|---|---|---|---|---|
| SL-BCH | | | | X |
| SL-SCH | X | | | |

FIG. 4C

SDAP
PDCP
RLC
MAC
PHY
SDAP
PDCP
RLC
MAC
PHY
UE 125A
UE 125B

RRC
PDCP
RLC
MAC
PHY
RRC
PDCP
RLC
MAC
PHY
UE 125A
UE 125B

PC5-S
PDCP
RLC
MAC
PHY
PC5-S
PDCP
RLC
MAC
PHY
UE 125A
UE 125B

RRC
RLC
MAC
PHY
RRC
RLC
MAC
PHY
UE 125A
UE 125B

| Physical Signal | DM-RS | PT-RS | PRS | CSI-RS | PSS | SSS | SRS | S-PSS | S-SSS |
|---|---|---|---|---|---|---|---|---|---|
| DL | X | X | X | X | X | X | | | |
| UL | X | X | | | | | X | | |
| SL | X | X | | X | | | | X | X |

FIG. 6

| Bit | Short Message |
|---|---|
| 1 | ***systemInfoModification:*** If set to 1: indication of a BCCH modification other than SIB6, SIB7 and SIB8. |
| 2 | ***etwsAndCmasIndication:*** If set to 1: indication of an ETWS primary notification and/or an ETWS secondary notification and/or a CMAS notification. |
| 3 | ***MBSsysteminfoModification:*** If set to 1: indication of MBS SIB modification. and shall be ignored by non-MBSs UE if received |
| 4 | ***MBSNotficationFlag:*** If set to 1: indication of MBS Notification in paging Message and shall be ignored by non-MBSs UE if received |
| 5 – 8 | Not used in this release of the specification and shall be ignored by UE if received. |

FIG. 19

| Bit | Short Message |
|---|---|
| 1 | ***systemInfoModification:*** If set to 1: indication of a BCCH modification other than SIB6, SIB7 and SIB8. |
| 2 | ***etwsAndCmasIndication:*** If set to 1: indication of an ETWS primary notification and/or an ETWS secondary notification and/or a CMAS notification. |
| 3-7 | ***MBSNotficationCode:*** If set to 0000: indication of MBS SIB modification only, otherwise it points to a row of a pre-configured table of MBS notification combinations. Shall be ignored by non-MBSs UE if received. |
| 8 | Not used in this release of the specification and shall be ignored by UE if received. |

FIG. 20

| Index | Notification Type | MBS Service Type | MBS Service Group | Feedback Info |
|---|---|---|---|---|
| 1-n | A. SIB Update<br>B. Session Start/Activation or Stop/Deactivation<br>C. Configuration Change<br>D. Counting Order | Multicast/Broadcast | e.g., MBS Service ID(s), TMGI(s) | NULL or UL Resource Index |
| 1 | A | Multicast | TMGI1 | NULL |
| 2 | B | Multicast | TMGI1 | NULL |
| 3 | A | Broadcast | TMGI2 | NULL |
| 4 | D | Broadcast | TMGI2 | Resource Set 1 |
| ... | | | | |
| n | | | | |

FIG. 22

GROUP NOTIFICATION AND CONFIRMATION FOR MULTICAST BROADCAST SERVICES

CROSS-REFERENCE TO RELATED APPLICATIONS

This application is a national stage application of PCT/US2022/32763, filed Jun. 9, 2022 (the PCT application"), now filed in the United States under 35 USC § 371. The PCT application claims priority under 35 USC § 119(e) from U.S. Provisional Patent Application No. 63/209,842, filed on Jun. 11, 2021 ("the provisional application"); the contents of each of the PCT application and the provisional patent application are incorporated herein by reference.

BACKGROUND OF THE INVENTION

The present invention is directed to 5G, which is the 5$^{th}$ generation mobile network. It is a new global wireless standard after 1G, 2G, 3G, and 4G networks. 5G enables networks designed to connect machines, objects and devices.

The invention is more specifically directed to apparatus and methods for notification signaling, including providing a framework for and enhancing existing signaling mechanisms to achieve efficient MBS-related notification.

SUMMARY OF THE INVENTION

In an embodiment, the invention provides a method of multicast broadcast services (MBS) notification signaling includes receiving, by a user equipment (UE), a downlink control information (DCI). The DCI is associated with a first radio network temporary identifier (RNTI) corresponding at least to MBS-related notifications and includes a field with a plurality of bits. One or more bits of the plurality of bits of the field indicate an update or a change to one or more MBS-related parameters. The method also includes determining, based on the indication by the one or more bits, to monitor signaling indicating the updated or changed MBS-related parameters and receiving MBS data based on the updated or changed MBS-related parameters. Receiving the downlink control information (DCI) may be based on a physical downlink control channel (PDCCH). Receiving the downlink control information (DCI) may occur while the user equipment (UE) is in a radio resource control (RRC) connected state, or while the user equipment (UE) is in a radio resource control (RRC) idle state or an RRC inactive state. Receiving the downlink control information (DCI) also may occur based on monitoring a downlink control channel in a monitoring occasion determined based on a discontinuous reception (DRX) procedure in the radio resource control (RRC) idle state or the RRC inactive state.

Preferably, the first radio network temporary identifier (RNTI) is a paging RNTI and the downlink control information (DCI) is associated with transmission of paging information. For that matter, the first radio network temporary identifier (RNTI) may be a multicast broadcast services (MBS)-RNTI. One or more bits of the plurality bits of the field indicate a broadcast control channel (BCCH) modification. Determining to monitor signaling associated with updated or changed multicast broadcast services (MBS)-related parameters may be further based on the user equipment (UE) being an MBS UE, Preferably, the multicast broadcast services (MBS)-related parameters comprise semi-persistent scheduling (SPS) configuration parameters for reception of MBS data.

A multicast broadcast services (MBS) notification, received based on the downlink control information (DCI), indicates one or more of: a notification type, a target MBS service type, a target MBS Service or group identifiers (IDs) and uplink feedback or reply. The notification type comprises at least one of: multicast broadcast services (MBS) system information update, MBS session start/activation or MBS session stop/deactivation, MBS configuration change before or during an active session and MBS counting order to seek interest indication. The multicast broadcast services (MBS) service type may be one of a plurality of MBS service types comprising a multicast service type and a broadcast service type. The target multicast broadcast services (MBS) service or group identifiers (IDs) may be from a plurality of target MBS Service or group IDs comprising an MBS paging ID and a Temporary Mobile Group Identity (TMGI). The uplink feedback or reply comprises a need for trigger and resource to use.

The plurality of bits comprise a flag indicating presence of a multicast broadcast services (MBS) notification. Preferably, the flag comprises a bit, where a first value of the bit indicates presence of the multicast broadcast services (MBS) notification and a second value of the bit indicates an absence of the MBS notification. For that matter, the first value may be one while the second value is zero, and the flag may be ignored by a non-multicast broadcast services (MBS) user equipment (UE). The plurality of bits of the field may comprise one or more first bits indicating a modification of multicast broadcast services (MBS) system information block (SIB). The multicast broadcast services (MBS) system information block (SIB) can indicate random access resources. The random access resources preferably are used by the user equipment (UE) for multicast broadcast services (MBS) interest indication signaling.

The multicast broadcast services (MBS) notification may comprise an information element indicating request for MBS interest indication and reception of the MBS notification may trigger MBS interest indication signaling by the user equipment (UE). Transmission of the interest indication signaling may be based on a randomization seed or according to a probability. He method may also include receiving a configuration parameter indicating the randomization seed or the probability. The random access resources may comprise first random access resources associated with a first beam. For that matter, the random access resources may be partitioned into a plurality of random access resource sets, where each random access resource set, in the plurality of random access resource sets, is associated with a corresponding beam or distributed unit (DU). The one or more bits of the plurality of bits of the field may include one of a plurality of values and each value in the plurality of values may be mapped to a combination of modifications or changes.

The combination of modifications or changes may be preconfigured; the combination of modifications or changes is configurable. The method may also include receiving system information indicating the combination of modifications or changes; and receiving one or more radio resource control (RRC) configuration parameters indicating the combination of modifications or changes. The one or more bits preferably are ignored by a non-multicast broadcast services (MBS) user equipment (UE).

In an embodiment, the invention provides a user equipment (UE) with one or more processors and memory storing instructions, that when executed by the one or more processors cause the UE to: receive a downlink control information (DCI), wherein: the DCI is associated with a first radio network temporary identifier (RNTI) corresponding at least to MBS-related notifications; the DCI comprises a field comprising a plurality of bits; one or more bits of the plurality of bits of the field indicate an update or a change to one or more MBS-related parameters; determine, based on the indication by the one or more bits, to monitor signaling indicating the updated or changed MBS-related parameters; and receive MBS data based on the updated or changed MBS-related parameters. Receiving the downlink control information (DCI) may be based on a physical downlink control channel (PDCCH). Receiving the downlink control information (DCI) may occur while the user equipment (UE) is in a radio resource control (RRC) connected state, may occur while the user equipment (UE) is in a radio resource control (RRC) idle state or an RRC inactive state and may occur based on monitoring a downlink control channel in a monitoring occasion determined based on a discontinuous reception (DRX) procedure in the radio resource control (RRC) idle state or the RRC inactive state.

The first radio network temporary identifier (RNTI) is a paging RNTI and the downlink control information (DCI) is associated with transmission of paging information. The first radio network temporary identifier (RNTI) is a multicast broadcast services (MBS)-RNTI. One or more bits of the plurality bits of the field may indicate a broadcast control channel (BCCH) modification. For that matter, determining to monitor signaling associated with updated or changed multicast broadcast services (MBS)-related parameters may be further based on the user equipment (UE) being an MBS UE. The multicast broadcast services (MBS)-related parameters may comprise semi-persistent scheduling (SPS) configuration parameters for reception of MBS data, wherein a multicast broadcast services (MBS) notification, received based on the downlink control information (DCI), indicates one or more of: a notification type; target MBS service type; target MBS Service or group identifiers (IDs); and uplink feedback or reply.

The notification type may comprise at least one of: Multicast broadcast services (MBS) system information update; MBS session start/activation or MBS session stop/deactivation; MBS configuration change before or during an active session; and MBS counting order to seek interest indication. Preferably, the multicast broadcast services (MBS) service type is one of a plurality of MBS service types comprising a multicast service type and a broadcast service type. The target multicast broadcast services (MBS) service or group identifiers (IDs) may be from a plurality of target MBS Service or group IDs comprising an MBS paging ID and a Temporary Mobile Group Identity (TMGI). An uplink feedback or reply comprises a need for trigger and resource to use. The plurality of bits may comprise a flag indicating presence of a multicast broadcast services (MBS) notification. The flag preferably comprises a bit, a first value of the bit indicates presence of the multicast broadcast services (MBS) notification and a second value of the bit indicates an absence of the MBS notification. In one form, the first value is one and the second value is zero.

The flag may be ignored by a non-multicast broadcast services (MBS) user equipment (UE). The plurality of bits of the field may comprise one or more first bits indicating a modification of multicast broadcast services (MBS) system information block (SIB). The multicast broadcast services (MBS) system information block (SIB) may indicates random access resources. The random access resources may be used by the user equipment (UE) for multicast broadcast services (MBS) interest indication signaling. For that matter, the multicast broadcast services (MBS) notification may comprise an information element indicating request for MBS interest indication and reception of the MBS notification may trigger MBS interest indication signaling by the user equipment (UE). Transmission of the interest indication signaling may be based on a randomization seed or according to a probability. For that matter, the instructions, when executed by the one or more processors, may further cause the UE to receive a configuration parameter indicating the randomization seed or the probability.

The random access resources comprise first random access resources associated with a first beam. The random access resources preferably are partitioned into a plurality of random access resource sets and each random access resource set, in the plurality of random access resource sets, preferably is associated with a corresponding beam or distributed unit (DU). In one form, the one or more bits of the plurality of bits of the filed has one of a plurality of values and each value in the plurality of values is mapped to a combination of modifications or changes. The combination of modifications or changes may be preconfigured, and alternatively, configurable. The instructions, when executed by the one or more processors, may further cause the UE to receive system information indicating the combination of modifications or changes, and may further cause the UE to receive one or more radio resource control (RRC) configuration parameters indicating the combination of modifications or changes. The one or more bits preferably are ignored by a non-multicast broadcast services (MBS) user equipment (UE).

BRIEF DESCRIPTION OF THE DRAWINGS

FIG. 3A, FIG. 3B and FIG. 3C show example mappings between logical channels and transport channels in downlink, uplink and sidelink, respectively, according to some aspects of some of various exemplary embodiments of the present disclosure.

FIG. 4A, FIG. 4B and FIG. 4C show example mappings between transport channels and physical channels in downlink, uplink and sidelink, respectively, according to some aspects of some of various exemplary embodiments of the present disclosure.

FIG. 6 shows example physical signals in downlink, uplink and sidelink according to some aspects of some of various exemplary embodiments of the present disclosure.

FIG. 19 shows an example Extended Short Message Field in Paging DCI according to some aspects of some of various exemplary embodiments of the present disclosure.

FIG. 20 shows an example Extended Short Message Field in Paging DCI according to some aspects of some of various exemplary embodiments of the present disclosure.

FIG. 22 shows an example RRC-SIB Configured Table of MBS Notification Combinations according to some aspects of some of various exemplary embodiments of the present disclosure.

DETAILED DESCRIPTION

Figure 1:
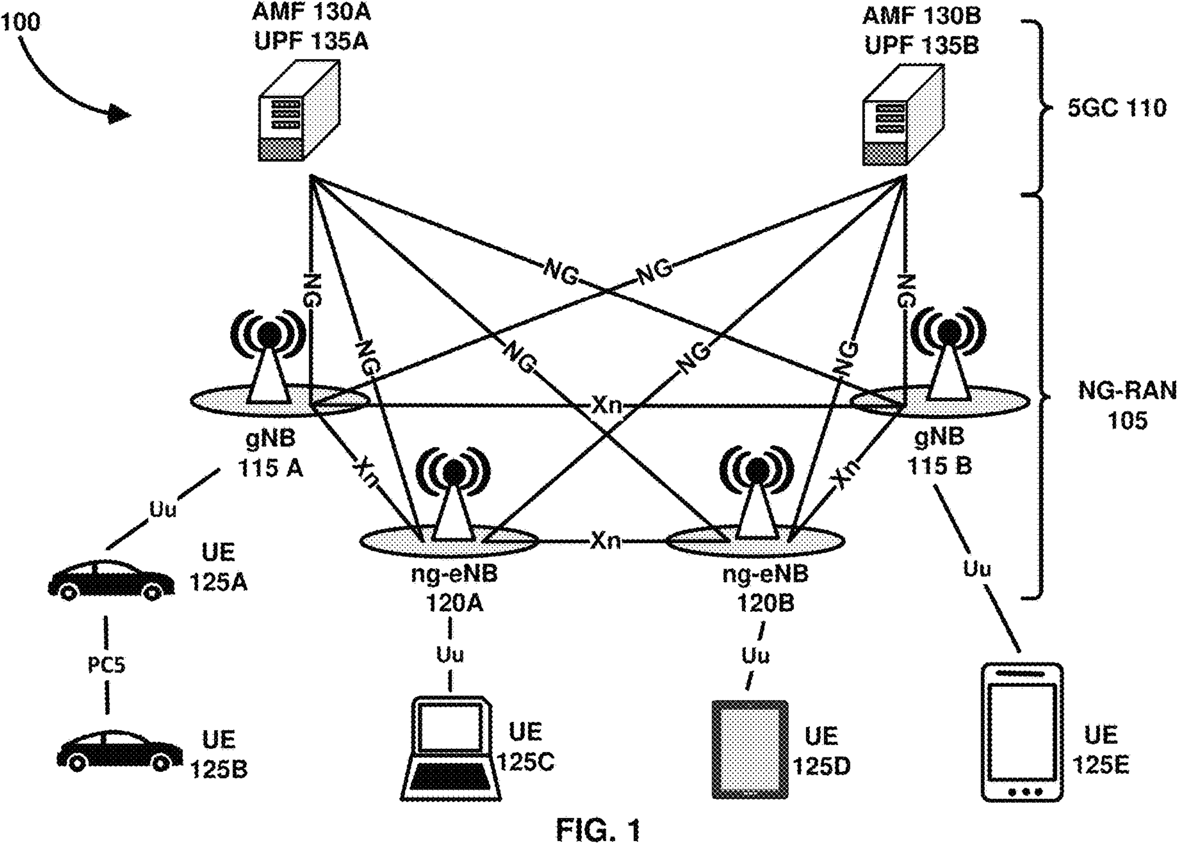
FIG. 1 shows an example of a system of mobile communications according to some aspects of some of various exemplary embodiments of the present disclosure.

FIG. 1 shows an example of a system of mobile communications 100 according to some aspects of some of various exemplary embodiments of the present disclosure. The system of mobile communication 100 may be operated by a wireless communications system operator such as a Mobile Network Operator (MNO), a private network operator, a Multiple System Operator (MSO), an Internet of Things (IoT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IoT (IIOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5GC) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The RAN implements a Radio Access Technology (RAT) and resides between User Equipments (UEs) 125 and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UE 125 and the RAN (e.g., the NG-RAN 105) may be referred to as Access Stratum (AS) and the functional layer between the UE 125 and the core network (e.g., the 5GC 110) may be referred to as Non-access Stratum (NAS).

The UEs 125 may include wireless transmission and reception means for communications with one or more nodes in the RAN, one or more relay nodes, or one or more other UEs, etc. Example of UEs include, but are not limited to, smartphones, tablets, laptops, computers, wireless transmission and/or reception units in a vehicle, V2X or Vehicle to Vehicle (V2V) devices, wireless sensors, IoT devices, IIOT devices, etc. Other names may be used for UEs such as a Mobile Station (MS), terminal equipment, terminal node, client device, mobile device, etc.

The RAN may include nodes (e.g., base stations) for communications with the UEs. For example, the NG-RAN 105 of the system of mobile communications 100 may comprise nodes for communications with the UEs 125. Different names for the RAN nodes may be used, for example depending on the RAT used for the RAN. A RAN node may be referred to as Node B (NB) in a RAN that uses the UMTS RAT. A RAN node may be referred to as an evolved Node B (eNB) in a RAN that uses LTE/EUTRA RAT. For the illustrative example of the system of mobile communications 100 in FIG. 1, the nodes of an NG-RAN 105 may be either a next generation Node B (gNB) 115 or a next generation evolved Node B (ng-eNB) 120. In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and GPRS Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 of the 5GC 110 by means of the NG-C interface and to a User Plane Function (UPF) 135 of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing & forwarding; Packet inspection and User plane part of Policy rule enforcement; Traffic usage reporting; Uplink classifier to support routing traffic flows to a data network; Branching point to support multi-homed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may be a link-layer identity that identifies a device or a group of devices that are recipients of sidelink communication frames. The Destination Layer-2 ID may be a link-layer identity that identifies a device that originates sidelink communication frames. In some examples, the Source Layer-2 ID and the Destination Layer-2 ID may be assigned by a management function in the Core Network. The Source Layer-2 ID may identify the sender of the data in NR sidelink communication. The Source Layer-2 ID may be 24 bits long and may be split in the MAC layer into two bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the Medium Access Control (MAC) header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

Figure 2A:
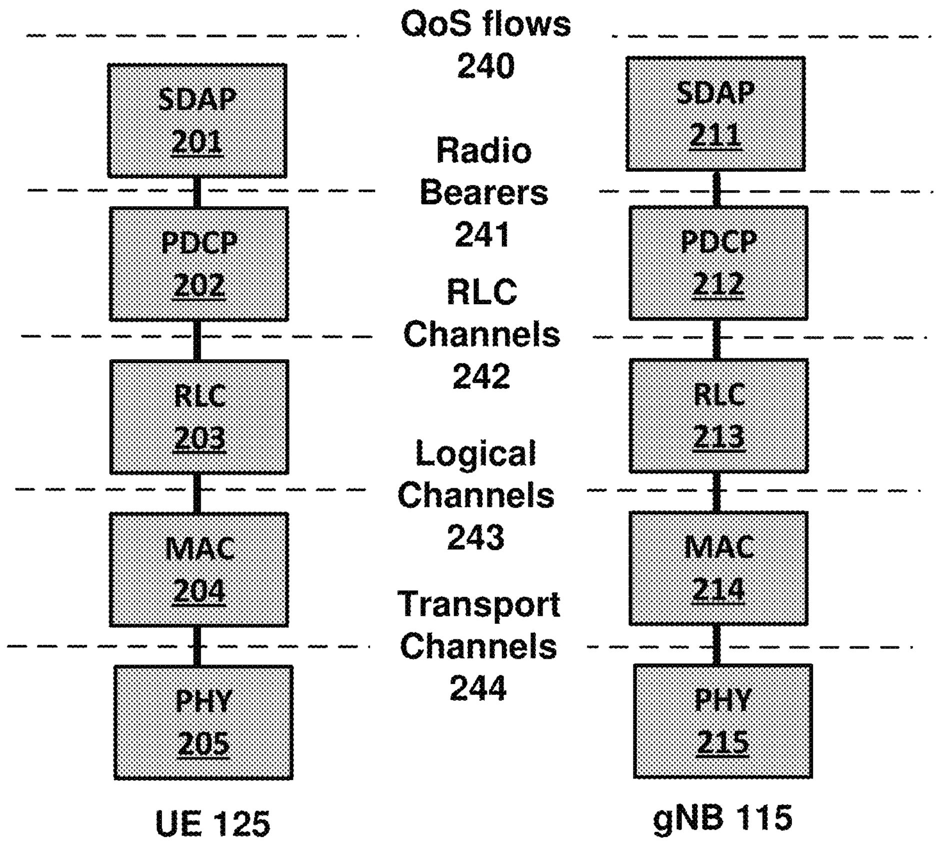
FIG. 2A and FIG. 2B show examples of radio protocol stacks for user plane and control plane, respectively, according to some aspects of some of various exemplary embodiments of the present disclosure.
Figure 2B:
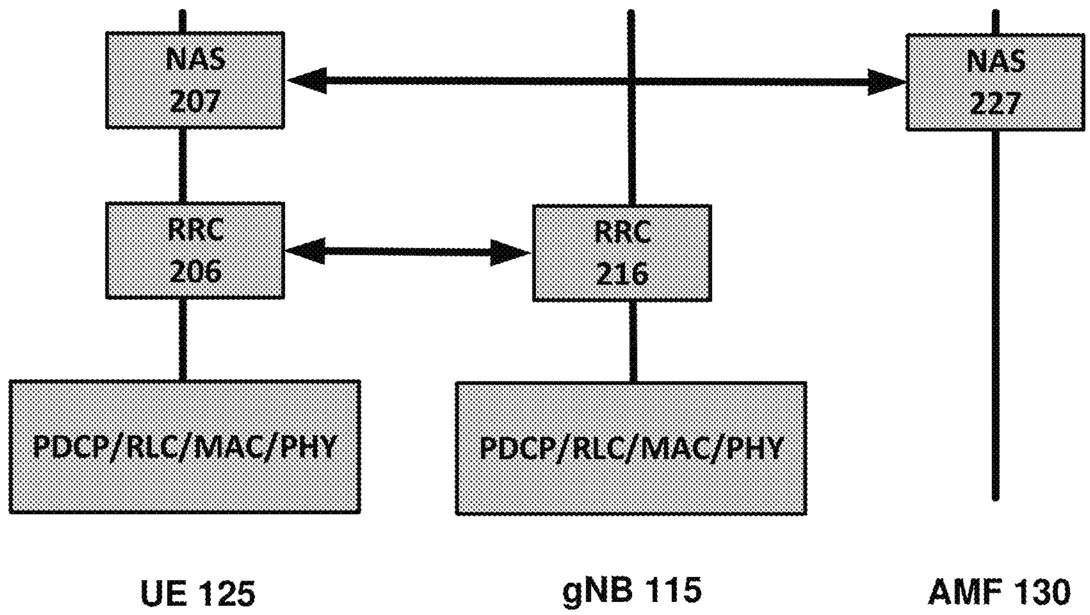

FIG. 2A and FIG. 2B show examples of radio protocol stacks for user plane and control plane, respectively, according to some aspects of some of various exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology (ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and re-segmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern (s).

FIG. 3A, FIG. 3B and FIG. 3C show example mappings between logical channels and transport channels in downlink, uplink and sidelink, respectively, according to some aspects of some of various exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink. Sidelink Control Channel (SCCH) is a sidelink channel for transmitting control information (e.g., PC5-RRC and PC5-S messages) from one UE to other UE(s). Sidelink Traffic Channel (STCH) is a sidelink channel for transmitting user information from one UE to other UE(s). Sidelink Broadcast Control Channel (SBCCH) is a sidelink channel for broadcasting sidelink system information from one UE to other UE(s).

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; support for UE discontinuous reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

The sidelink transport channel types include: Sidelink broadcast channel (SL-BCH) and Sidelink shared channel (SL-SCH). The SL-BCH may be characterized by pre-defined transport format. The SL-SCH may be characterized by support for unicast transmission, groupcast transmission and broadcast transmission; support for both UE autonomous resource selection and scheduled resource allocation by NG-RAN; support for both dynamic and semi-static resource allocation when UE is allocated resources by the NG-RAN; support for HARQ; and support for dynamic link adaptation by varying the transmit power, modulation and coding.

In the sidelink, the following connections between logical channels and transport channels may exist: SCCH may be mapped to SL-SCH; STCH may be mapped to SL-SCH; and SBCCH may be mapped to SL-BCH.

FIG. 4A, FIG. 4B and FIG. 4C show example mappings between transport channels and physical channels in downlink, uplink and sidelink, respectively, according to some aspects of some of various exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The physical channels in the sidelink include Physical Sidelink Shared Channel (PSSCH), Physical Sidelink Control Channel (PSCCH), Physical Sidelink Feedback Channel (PSFCH) and Physical Sidelink Broadcast Channel (PSBCH). The Physical Sidelink Control Channel (PSCCH) may indicate resource and other transmission parameters used by a UE for PSSCH. The Physical Sidelink Shared Channel (PSSCH) may transmit the TBs of data themselves, and control information for HARQ procedures and CSI feedback triggers, etc. At least 6 OFDM symbols within a slot may be used for PSSCH transmission. Physical Sidelink Feedback Channel (PSFCH) may carry the HARQ feedback over the sidelink from a UE which is an intended recipient of a PSSCH transmission to the UE which performed the transmission. PSFCH sequence may be transmitted in one PRB repeated over two OFDM symbols near the end of the sidelink resource in a slot. The SL-SCH transport channel may be mapped to the PSSCH. The SL-BCH may be mapped to PSBCH. No transport channel is mapped to the PSFCH but Sidelink Feedback Control Information (SFCI) may be mapped to the PSFCH. No transport channel is mapped to PSCCH but Sidelink Control Information (SCI) may mapped to the PSCCH.

Figures 5A, 5B, 5C, 5D:
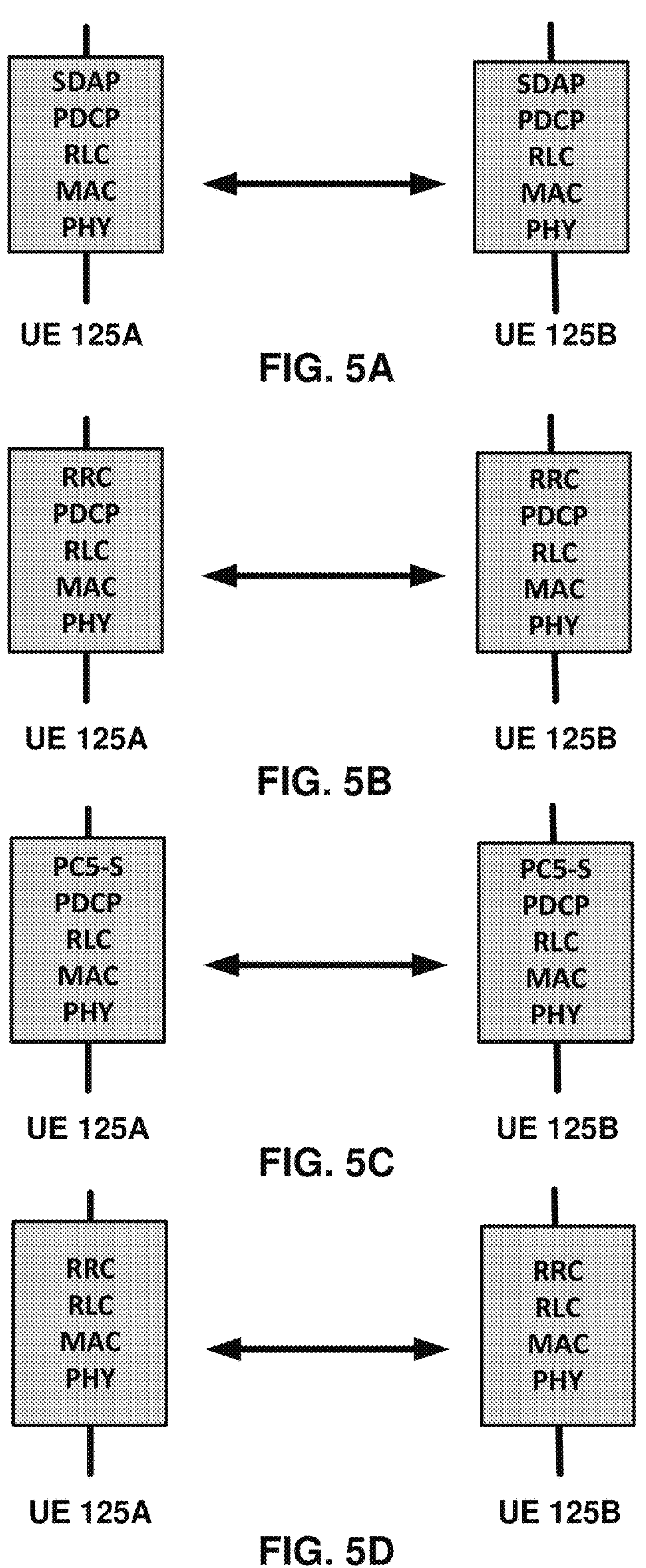
FIG. 5A, FIG. 5B, FIG. 5C and FIG. 5D show examples of radio protocol stacks for NR sidelink communication according to some aspects of some of various exemplary embodiments of the present disclosure.

FIG. 5A, FIG. 5B, FIG. 5C and FIG. 5D show examples of radio protocol stacks for NR sidelink communication according to some aspects of some of various exemplary embodiments of the present disclosure. The AS protocol stack for user plane in the PC5 interface (i.e., for STCH) may consist of SDAP, PDCP, RLC and MAC sublayers, and the physical layer. The protocol stack of user plane is shown in FIG. 5A. The AS protocol stack for SBCCH in the PC5 interface may consist of RRC, RLC, MAC sublayers, and the physical layer as shown below in FIG. 5B. For support of PC5-S protocol, PC5-S is located on top of PDCP, RLC and MAC sublayers, and the physical layer in the control plane protocol stack for SCCH for PC5-S, as shown in FIG. 5C. The AS protocol stack for the control plane for SCCH for RRC in the PC5 interface consists of RRC, PDCP, RLC and MAC sublayers, and the physical layer. The protocol stack of control plane for SCCH for RRC is shown in FIG. 5D.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization restrictions in MAC, only sidelink logical channels belonging to the same destination may be multiplexed into a MAC PDU for every unicast, groupcast and broadcast transmission which may be associated to the destination. For packet filtering, a SL-SCH MAC header including portions of both Source Layer-2 ID and a Destination Layer-2 ID may be added to a MAC PDU. The Logical Channel Identifier (LCID) included within a MAC subheader may uniquely identify a logical channel within the scope of the Source Layer-2 ID and Destination Layer-2 ID combination.

The services and functions of the RLC sublayer may be supported for sidelink. Both RLC Unacknowledged Mode (UM) and Acknowledged Mode (AM) may be used in unicast transmission while only UM may be used in groupcast or broadcast transmission. For UM, only unidirectional transmission may be supported for groupcast and broadcast.

The services and functions of the PDCP sublayer for the Uu interface may be supported for sidelink with some restrictions: Out-of-order delivery may be supported only for unicast transmission; and Duplication may not be supported over the PC5 interface.

The SDAP sublayer may provide the following service and function over the PC5 interface: Mapping between a QoS flow and a sidelink data radio bearer. There may be one SDAP entity per destination for one of unicast, groupcast and broadcast which is associated to the destination.

The RRC sublayer may provide the following services and functions over the PC5 interface: Transfer of a PC5-RRC message between peer UEs; Maintenance and release of a PC5-RRC connection between two UEs; and Detection of sidelink radio link failure for a PC5-RRC connection based on indication from MAC or RLC. A PC5-RRC connection may be a logical connection between two UEs for a pair of Source and Destination Layer-2 IDs which may be considered to be established after a corresponding PC5 unicast link is established. There may be one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages may be used for a UE to transfer UE capability and sidelink configuration including SL-DRB configuration to the peer UE. Both peer UEs may exchange their own UE capability and sidelink configuration using separate bi-directional procedures in both sidelink directions.

FIG. 6 shows example physical signals in downlink, uplink and sidelink according to some aspects of some of various exemplary embodiments of the present disclosure. The Demodulation Reference Signal (DM-RS) may be used in downlink, uplink and sidelink and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink, uplink and sidelink and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink and sidelink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transit them in the uplink to the base station using PUCCH or PUSCH. The CSI report may be carried in a sidelink MAC CE. The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS. The Sidelink PSS (S-PSS) and Sidelink SSS (S-SSS) may be used in sidelink for sidelink synchronization.

Figure 7:
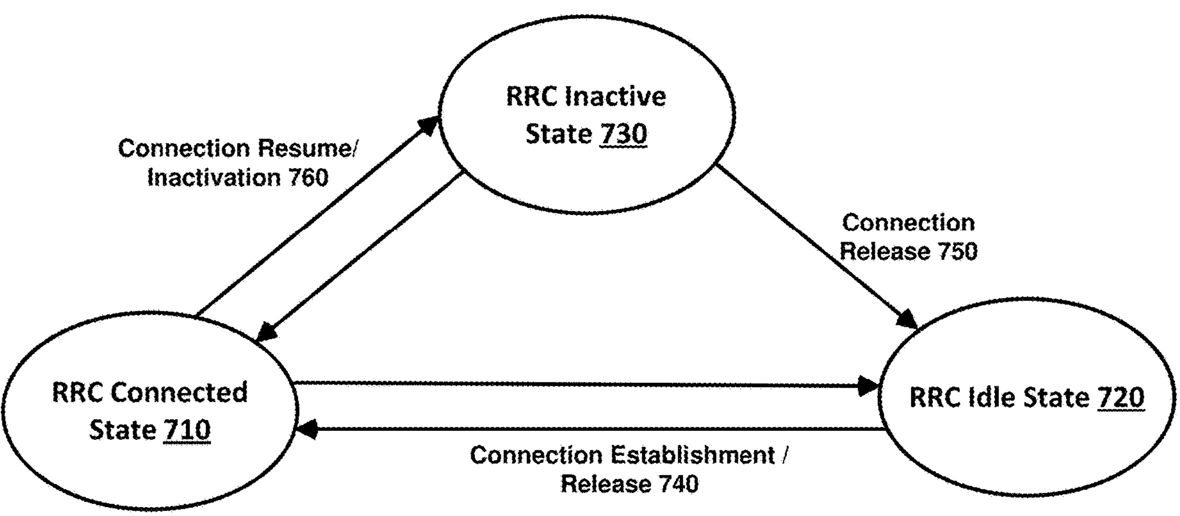
FIG. 7 shows examples of Radio Resource Control (RRC) states and transitioning between different RRC states according to some aspects of some of various exemplary embodiments of the present disclosure.

FIG. 7 shows examples of Radio Resource Control (RRC) states and transitioning between different RRC states according to some aspects of some of various exemplary embodiments of the present disclosure. A UE may be in one of three RRC states: RRC Connected State 710, RRC Idle State 720 and RRC Inactive state 730. After power up, the UE may be in RRC Idle state 720 and the UE may establish connection with the network using initial access and via an RRC connection establishment procedure to perform data transfer and/or to make/receive voice calls. Once RRC connection is established, the UE may be in RRC Connected State 710. The UE may transition from the RRC Idle state 720 to the RRC connected state 710 or from the RRC Connected State 710 to the RRC Idle state 720 using the RRC connection Establishment/Release procedures 740.

To reduce the signaling load and the latency resulting from frequent transitioning from the RRC Connected State 710 to the RRC Idle State 720 when the UE transmits frequent small data, the RRC Inactive State 730 may be used. In the RRC Inactive State 730, the AS context may be stored by both UE and gNB. This may result in faster state transition from the RRC Inactive State 730 to RRC Connected State 710. The UE may transition from the RRC Inactive State 730 to the RRC Connected State 710 or from the RRC Connected State 710 to the RRC Inactive State 730 using the RRC Connection Resume/Inactivation procedures 760. The UE may transition from the RRC Inactive State 730 to RRC Idle State 720 using an RRC Connection Release procedure 750.

Figure 8:
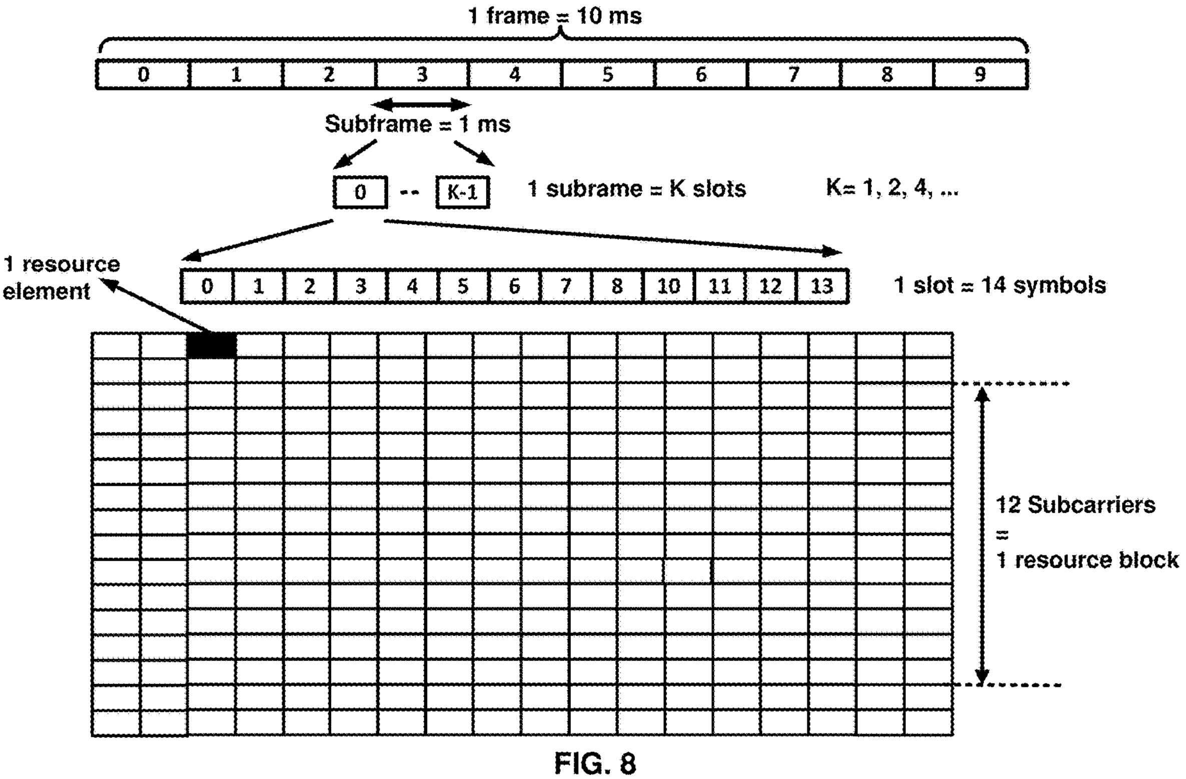
FIG. 8 shows example frame structure and physical resources according to some aspects of some of various exemplary embodiments of the present disclosure.

FIG. 8 shows example frame structure and physical resources according to some aspects of some of various exemplary embodiments of the present disclosure. The downlink or uplink or sidelink transmissions may be organized into frames with 10 ms duration, consisting of ten 1 ms subframes. Each subframe may consist of 1, 2, 4, . . . slots, wherein the number of slots per subframe may depend on the subcarrier spacing of the carrier on which the transmission takes place. The slot duration may be 14 symbols with Normal Cyclic Prefix (CP) and 12 symbols with Extended CP and may scale in time as a function of the used subcarrier spacing so that there is an integer number of slots in a subframe. FIG. 8 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example during 2, 4 or 7 OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 9:
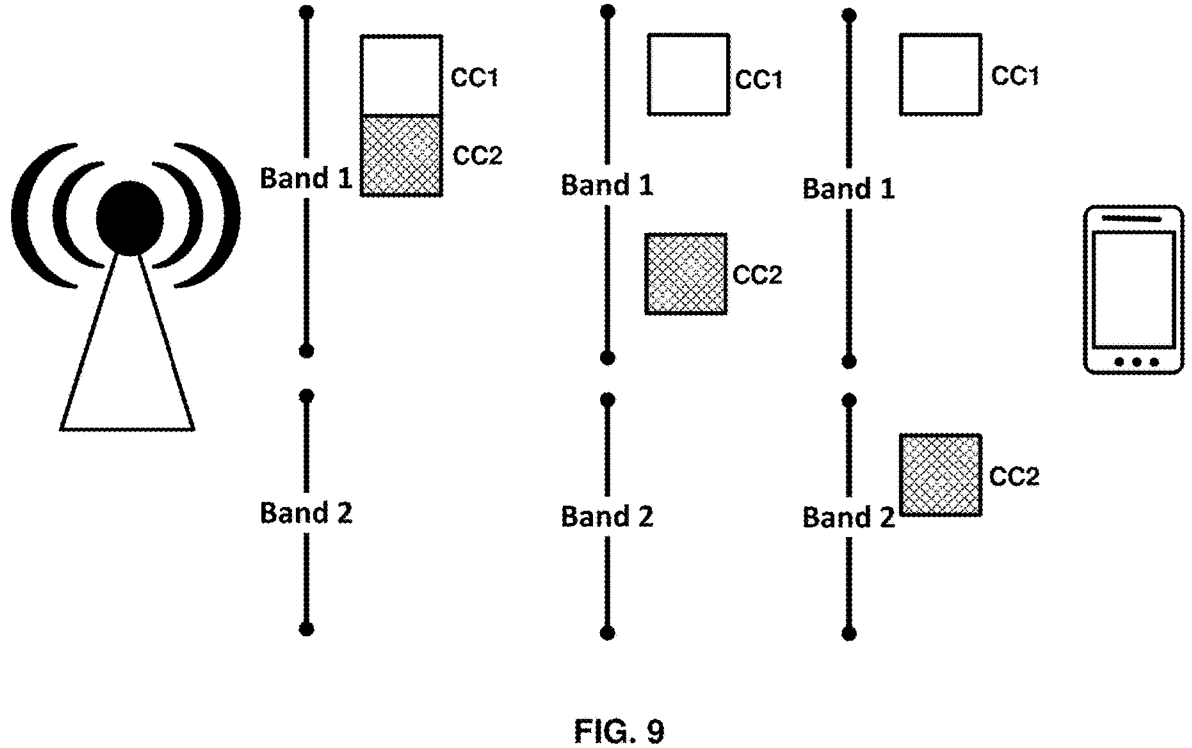
FIG. 9 shows example component carrier configurations in different carrier aggregation scenarios according to some aspects of some of various exemplary embodiments of the present disclosure.

FIG. 9 shows example component carrier configurations in different carrier aggregation scenarios according to some aspects of some of various exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 9. A gNB and the UE may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary cCell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE. The UE may use the provided TA to determine its uplink transmit timing relative to the UE's observed downlink receive timing.

In the RRC Connected state, the gNB may be responsible for maintaining the timing advance to keep the L1 synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE may use any of the activated SCells of this TAG as a timing reference cell and may not change it unless necessary.

Timing advance updates may be signaled by the gNB to the UE via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE with single timing advance capability for CA may simultaneously receive and/or transmit on multiple CCs corresponding to multiple serving cells sharing the same timing advance (multiple serving cells grouped in one TAG). A UE with multiple timing advance capability for CA may simultaneously receive and/or transmit on multiple CCs corresponding to multiple serving cells with different timing advances (multiple serving cells grouped in multiple TAGs). The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

Figure 10:
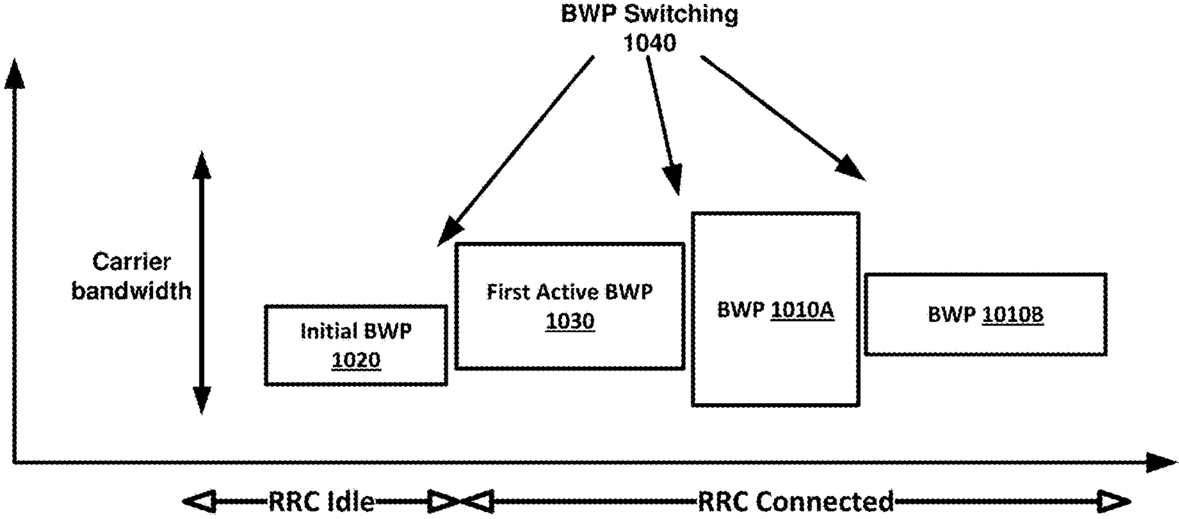
FIG. 10 shows example bandwidth part configuration and switching according to some aspects of some of various exemplary embodiments of the present disclosure.

FIG. 10 shows example bandwidth part configuration and switching according to some aspects of some of various exemplary embodiments of the present disclosure. The UE may be configured with one or more Bandwidth Parts (BWPs) 1010 on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 1020 determined from system information may be used. With Bandwidth Adaptation (BA), for example through BWP switching 1040, the receive and transmit bandwidth of a UE may not be as large as the bandwidth of the cell and may be adjusted. For example, the width may be ordered to change (e.g. to shrink during period of low activity to save power); the location may move in the frequency domain (e.g. to increase scheduling flexibility); and the subcarrier spacing may be ordered to change (e.g. to allow different services). The first active BWP 1020 may be the active BWP upon RRC (re-) configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 11:
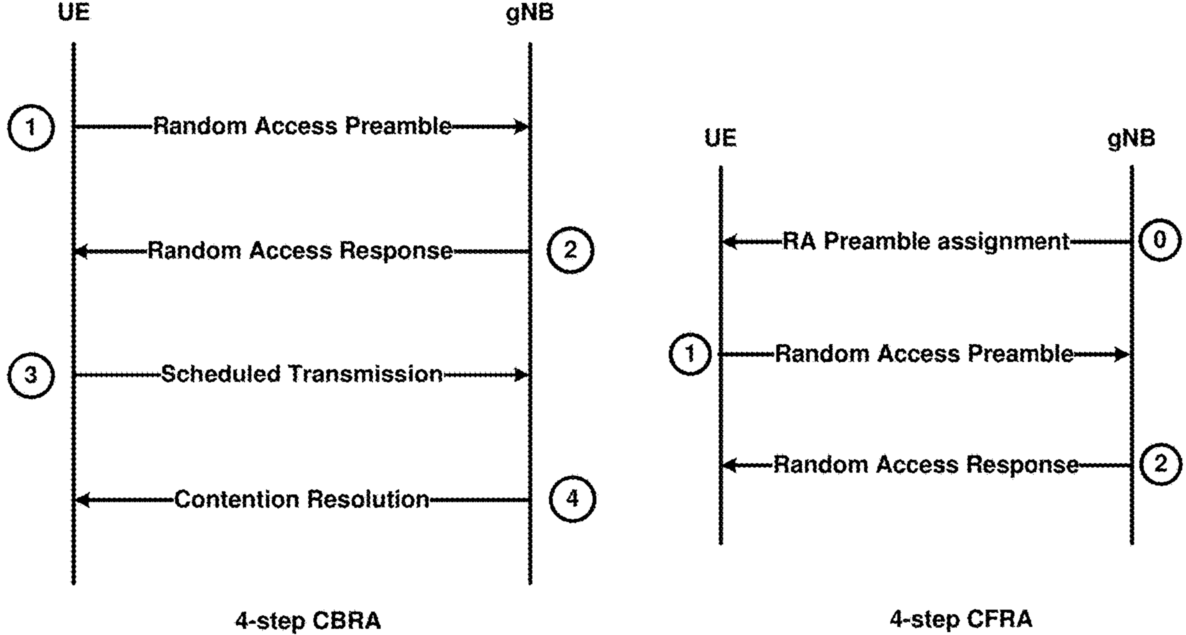
FIG. 11 shows example four-step contention-based and contention-free random access processes according to some aspects of some of various exemplary embodiments of the present disclosure.
Figure 12:
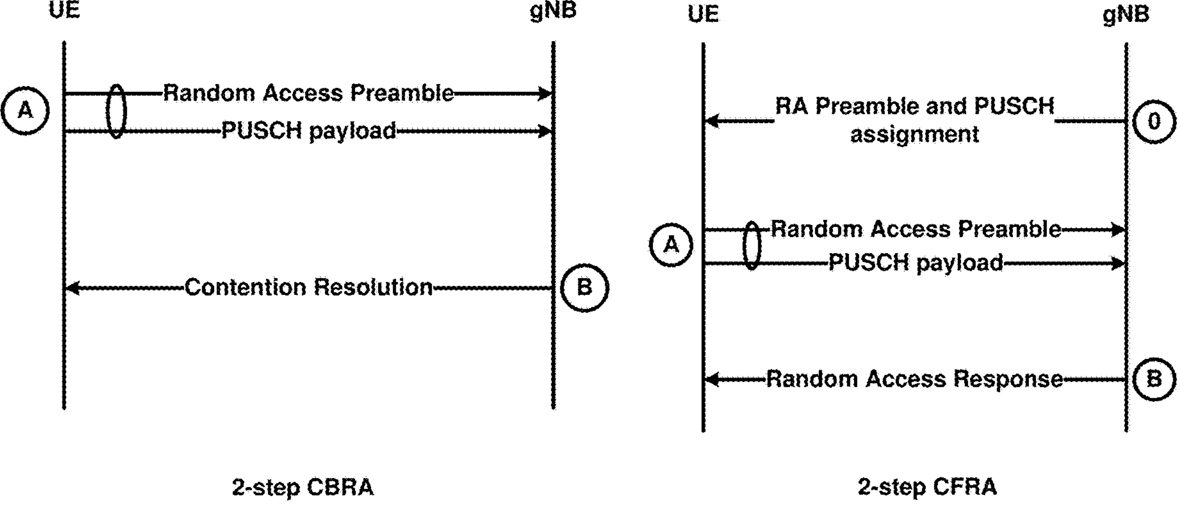
FIG. 12 shows example two-step contention-based and contention-free random access processes according to some aspects of some of various exemplary embodiments of the present disclosure.

FIG. 11 shows example four-step contention-based and contention-free random access processes according to some aspects of some of various exemplary embodiments of the present disclosure. FIG. 12 shows example two-step contention-based and contention-free random access processes according to some aspects of some of various exemplary embodiments of the present disclosure. The random access procedure may be triggered by a number of events, for example: Initial access from RRC Idle State; RRC Connection Re-establishment procedure; downlink or uplink data arrival during RRC Connected State when uplink synchronization status is "non-synchronized"; uplink data arrival during RRC Connected State when there are no PUCCH resources for Scheduling Request (SR) available; SR failure; Request by RRC upon synchronous reconfiguration (e.g. handover); Transition from RRC Inactive State; to establish time alignment for a secondary TAG; Request for Other System Information (SI); Beam Failure Recovery (BFR); Consistent uplink Listen-Before-Talk (LBT) failure on PCell.

Two types of Random Access (RA) procedure may be supported: 4-step RA type with MSG1 and 2-step RA type with MSGA. Both types of RA procedure may support Contention-Based Random Access (CBRA) and Contention-Free Random Access (CFRA) as shown in FIG. 11 and FIG. 12.

The UE may select the type of random access at initiation of the random access procedure based on network configuration. When CFRA resources are not configured, a RSRP threshold may be used by the UE to select between 2-step RA type and 4-step RA type. When CFRA resources for 4-step RA type are configured, UE may perform random access with 4-step RA type. When CFRA resources for 2-step RA type are configured, UE may perform random access with 2-step RA type.

The MSG1 of the 4-step RA type may consist of a preamble on PRACH. After MSG1 transmission, the UE may monitor for a response from the network within a configured window. For CFRA, dedicated preamble for MSG1 transmission may be assigned by the network and upon receiving Random Access Response (RAR) from the network, the UE may end the random access procedure as shown in FIG. 11. For CBRA, upon reception of the random access response, the UE may send MSG3 using the uplink grant scheduled in the random access response and may monitor contention resolution as shown in FIG. 11. If contention resolution is not successful after MSG3 (re) transmission(s), the UE may go back to MSG1 transmission.

The MSGA of the 2-step RA type may include a preamble on PRACH and a payload on PUSCH. After MSGA transmission, the UE may monitor for a response from the network within a configured window. For CFRA, dedicated preamble and PUSCH resource may be configured for MSGA transmission and upon receiving the network response, the UE may end the random access procedure as shown in FIG. 12. For CBRA, if contention resolution is successful upon receiving the network response, the UE may end the random access procedure as shown in FIG. 12; while if fallback indication is received in MSGB, the UE may perform MSG3 transmission using the uplink grant scheduled in the fallback indication and may monitor contention resolution. If contention resolution is not successful after MSG3 (re)transmission(s), the UE may go back to MSGA transmission.

Figure 13:
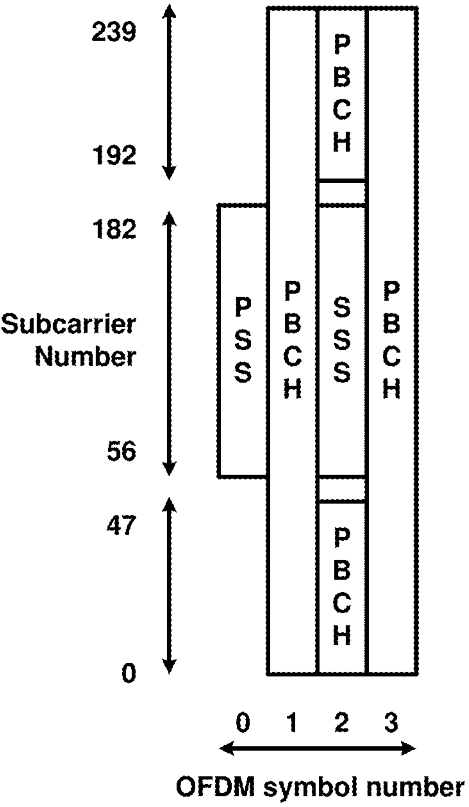
FIG. 13 shows example time and frequency structure of Synchronization Signal and Physical Broadcast Channel (PBCH) Block (SSB) according to some aspects of some of various exemplary embodiments of the present disclosure.

FIG. 13 shows example time and frequency structure of Synchronization Signal and Physical Broadcast Channel (PBCH) Block (SSB) according to some aspects of some of various exemplary embodiments of the present disclosure. The SS/PBCH Block (SSB) may consist of Primary and Secondary Synchronization Signals (PSS, SSS), each occupying 1 symbol and 127 subcarriers (e.g., subcarrier numbers 56 to 182 in FIG. 13), and PBCH spanning across 3 OFDM symbols and 240 subcarriers, but on one symbol leaving an unused part in the middle for SSS as show in FIG. 13. The possible time locations of SSBs within a half-frame may be determined by sub-carrier spacing and the periodicity of the half-frames, where SSBs are transmitted, may be configured by the network. During a half-frame, different SSBs may be transmitted in different spatial directions (i.e., using different beams, spanning the coverage area of a cell).

The PBCH may be used to carry Master Information Block (MIB) used by a UE during cell search and initial access procedures. The UE may first decode PBCH/MIB to receive other system information. The MIB may provide the UE with parameters required to acquire System Information Block 1 (SIB1), more specifically, information required for monitoring of PDCCH for scheduling PDSCH that carries SIB1. In addition, MIB may indicate cell barred status information. The MIB and SIB1 may be collectively referred to as the minimum system information (SI) and SIB1 may be referred to as remaining minimum system information (RMSI). The other system information blocks (SIBs) (e.g., SIB2, SIB3, . . . , SIB10 and SIBpos) may be referred to as Other SI. The Other SI may be periodically broadcast on DL-SCH, broadcast on-demand on DL-SCH (e.g., upon request from UEs in RRC Idle State, RRC Inactive State, or RRC connected State), or sent in a dedicated manner on DL-SCH to UEs in RRC Connected State (e.g., upon request, if configured by the network, from UEs in RRC Connected State or when the UE has an active BWP with no common search space configured).

Figure 14:
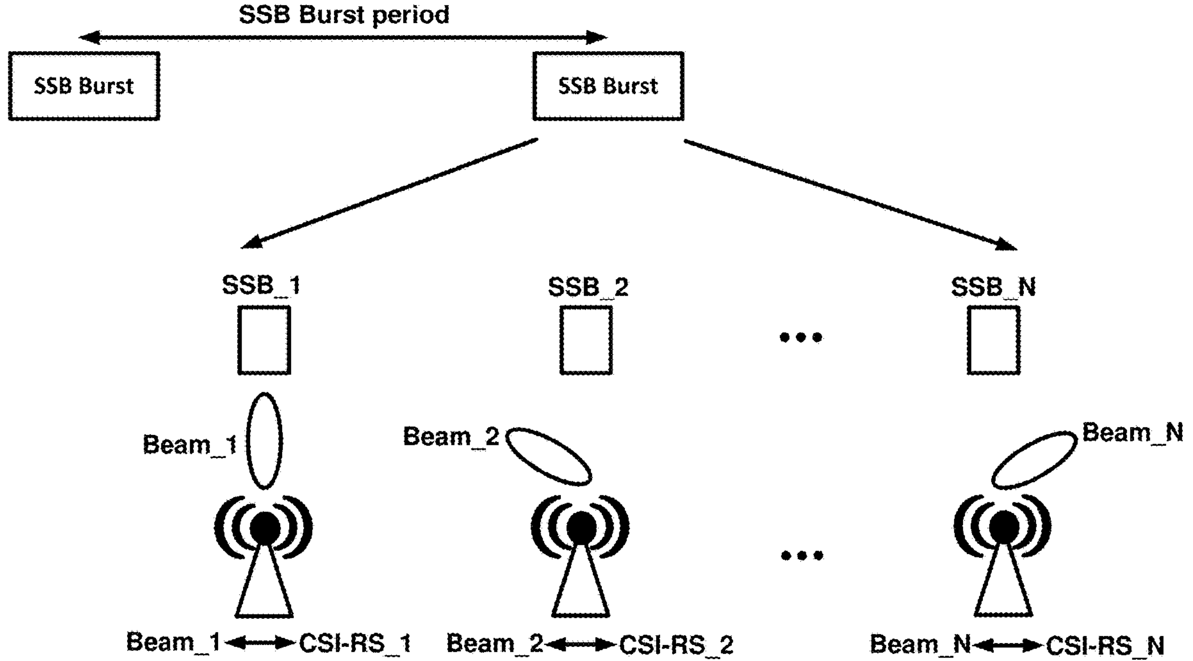
FIG. 14 shows example SSB burst transmissions according to some aspects of some of various exemplary embodiments of the present disclosure.

FIG. 14 shows example SSB burst transmissions according to some aspects of some of various exemplary embodiments of the present disclosure. An SSB burst may include N SSBs and each SSB of the N SSBs may correspond to a beam. The SSB bursts may be transmitted according to a periodicity (e.g., SSB burst period). During a contention-based random access process, a UE may perform a random access resource selection process, wherein the UE first selects an SSB before selecting a RA preamble. The UE may select an SSB with an RSRP above a configured threshold value. In some embodiments, the UE may select any SSB if no SSB with RSRP above the configured threshold is available. A set of random access preambles may be associated with an SSB. After selecting an SSB, the UE may select a random access preamble from the set of random access preambles associated with the SSB and may transmit the selected random access preamble to start the random access process.

In some embodiments, a beam of the N beams may be associated with a CSI-RS resource. A UE may measure CSI-RS resources and may select a CSI-RS with RSRP above a configured threshold value. The UE may select a random access preamble corresponding to the selected CSI-RS and may transmit the selected random access process to start the random access process. If there is no random access preamble associated with the selected CSI-RS, the UE may select a random access preamble corresponding to an SSB which is Quasi-Collocated with the selected CSI-RS.

In some embodiments, based on the UE measurements of the CSI-RS resources and the UE CSI reporting, the base station may determine a Transmission Configuration Indication (TCI) state and may indicate the TCI state to the UE, wherein the UE may use the indicated TCI state for reception of downlink control information (e.g., via PDCCH) or data (e.g., via PDSCH). The UE may use the indicated TCI state for using the appropriate beam for reception of data or control information. The indication of the TCI states may be using RRC configuration or in combination of RRC signaling and dynamic signaling (e.g., via a MAC Control element (MAC CE) and/or based on a value of field in the downlink control information that schedules the downlink transmission). The TCI state may indicate a Quasi-Colocation (QCL) relationship between a downlink reference signal such as CSI-RS and the DM-RS associated with the downlink control or data channels (e.g., PDCCH or PDSCH, respectively).

In some embodiments, the UE may be configured with a list of up to M TCI-State configurations, using Physical Downlink Shared Channel (PDSCH) configuration parameters, to decode PDSCH according to a detected PDCCH with DCI intended for the UE and the given serving cell, where M may depends on the UE capability. Each TCI-State may contain parameters for configuring a QCL relationship between one or two downlink reference signals and the DM-RS ports of the PDSCH, the DM-RS port of PDCCH or the CSI-RS port(s) of a CSI-RS resource. The quasi co-location relationship may be configured by one or more RRC parameters. The quasi co-location types corresponding to each DL RS may take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; 'QCL-TypeD': {Spatial Rx parameter}. The UE may receive an activation command (e.g., a MAC CE), used to map TCI states to the codepoints of a DCI field.

Figure 15:
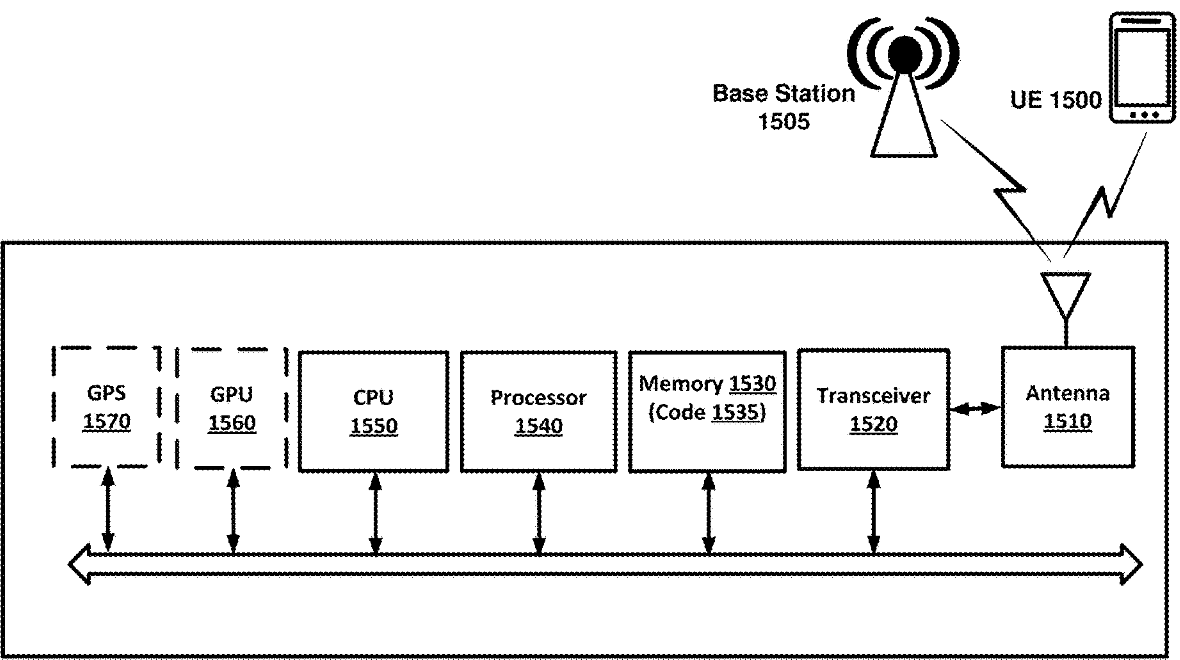
FIG. 15 shows example components of a user equipment and a base station for transmission and/or reception according to some aspects of some of various exemplary embodiments of the present disclosure.

FIG. 15 shows example components of a user equipment and a base station for transmission and/or reception according to some aspects of some of various exemplary embodiments of the present disclosure. All or a subset of blocks and functions in FIG. 15 may be in the base station 1505 and the user equipment 1500 and may be performed by the user equipment 1500 and by the base station 1505. The Antenna 1510 may be used for transmission or reception of electromagnetic signals. The Antenna 1510 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 150 may enable a massive MIMO configuration with tens or hundreds of antenna elements. The Antenna 1510 may enable other multi-antenna techniques such as beamforming. In some examples and depending on the UE 1500 capabilities or the type of UE 1500 (e.g., a low-complexity UE), the UE 1500 may support a single antenna only.

The transceiver 1520 may communicate bi-directionally, via the Antenna 1510, wireless links as described herein. For example, the transceiver 1520 may represent a wireless transceiver at the UE and may communicate bi-directionally with the wireless transceiver at the base station or vice versa. The transceiver 1520 may include a modem to modulate the packets and provide the modulated packets to the Antennas 1510 for transmission, and to demodulate packets received from the Antennas 1510.

The memory 1530 may include RAM and ROM. The memory 1530 may store computer-readable, computer-executable code 1535 including instructions that, when executed, cause the processor to perform various functions described herein. In some examples, the memory 1530 may contain, among other things, a Basic Input/output System (BIOS) which may control basic hardware or software operation such as the interaction with peripheral components or devices.

The processor 1540 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1540 may be configured to operate a memory using a memory controller. In other examples, a memory controller may be integrated into the processor 1540. The processor 1540 may be configured to execute computer-readable instructions stored in a memory (e.g., the memory 1530) to cause the UE 1500 or the base station 1505 to perform various functions.

The Central Processing Unit (CPU) 1550 may perform basic arithmetic, logic, controlling, and Input/output (I/O) operations specified by the computer instructions in the Memory 1530. The user equipment 1500 and/or the base station 1505 may include additional peripheral components such as a graphics processing unit (GPU) 1560 and a Global Positioning System (GPS) 1570. The GPU 1560 is a specialized circuitry for rapid manipulation and altering of the Memory 1530 for accelerating the processing performance of the user equipment 1500 and/or the base station 1505. The GPS 1570 may be used for enabling location-based services or other services for example based on geographical position of the user equipment 1500.

In some examples, the UE may use Discontinuous Reception (DRX) in RRC_IDLE and RRC_INACTIVE state in order to reduce power consumption. The UE may monitor one paging occasion (PO) per DRX cycle. A PO may be a set of PDCCH monitoring occasions and may comprise of multiple time slots (e.g., subframe or OFDM symbol) where paging DCI may be sent. One Paging Frame (PF) may be one Radio Frame and may contain one or multiple PO(s) or starting point of a PO.

In some examples, in multi-beam operations, the UE may assume that the same paging message and the same Short Message may be repeated in transmitted beams. The selection of the beam(s) for the reception of the paging message and Short Message may be up to UE implementation. The paging message may be same for both RAN initiated paging and CN initiated paging.

In some examples, the UE may initiate RRC Connection Resume procedure upon receiving RAN initiated paging. If the UE receives a CN initiated paging in RRC_INACTIVE state, the UE may move to RRC_IDLE and informs NAS.

In some examples, the PF and PO for paging may be determined by the following formulae: SFN for the PF is determined by: (SFN+PF_offset) mod T=(T div N)*(UE_ID mod N); Index (i_s), indicating the index of the PO is determined by: i_s=floor (UE_ID/N) mod Ns.

In some examples, the PDCCH monitoring occasions for paging may be determined according to pagingSearchSpace and firstPDCCH-MonitoringOccasionOfPO and nrofPDCCH-MonitoringOccasionPerSSB-InPO if configured. When SearchSpaceId=0 is configured for pagingSearchSpace, the PDCCH monitoring occasions for paging may be same as for RMSI.

In some examples, when SearchSpaceId=0 is configured for pagingSearchSpace, Ns may be either 1 or 2. For Ns=1, there may be only one PO which may start from the first PDCCH monitoring occasion for paging in the PF. For Ns=2, PO may be either in the first half frame (i_s=0) or the second half frame (i_s=1) of the PF.

In some examples, when SearchSpaceId other than 0 is configured for pagingSearchSpace, the UE may monitor the $(i\_s+1)^{th}$ PO. A PO may be a set of 'S*X' consecutive PDCCH monitoring occasions where 'S' is the number of actual transmitted SSBs determined according to ssb-PositionsInBurst in SIB1 and X may be the nrofPDCCH-MonitoringOccasionPerSSB-InPO if configured or may be equal to 1 otherwise. The $[x*S+K]^{th}$ PDCCH monitoring occasion for paging in the PO may correspond to the Kth transmitted SSB, where x=0, 1, . . . , X−1, K=1, 2, . . . , S. The PDCCH monitoring occasions for paging which do not overlap with UL symbols (determined according to tdd-UL-DL-ConfigurationCommon) may be sequentially numbered from zero starting from the first PDCCH monitoring occasion for paging in the PF. When firstPDCCH-MonitoringOccasionOfPO is present, the starting PDCCH monitoring occasion number of $(i\_s+1)^{th}$ PO is the $(i\_s+1)^{th}$ value of the firstPDCCH-MonitoringOccasionOfPO parameter; otherwise, it may be equal to i_s*S*X. If X>1, when the UE detects a PDCCH transmission addressed to P-RNTI within its PO, the UE may not be required to monitor the subsequent PDCCH monitoring occasions for this PO.

In some examples, a PO associated with a PF may start in the PF or after the PF. In some examples, the PDCCH monitoring occasions for a PO may span multiple radio frames. When SearchSpaceId other than 0 is configured for paging-SearchSpace the PDCCH monitoring occasions for a PO may span multiple periods of the paging search space.

In some examples, the following parameters are used for the calculation of PF and i_s above: T: DRX cycle of the UE (T may be determined by the shortest of the UE specific DRX value(s), if configured by RRC and/or upper layers, and a default DRX value broadcast in system information. In RRC_IDLE state, if UE specific DRX is not configured by upper layers, the default value is applied); N: number of total paging frames in T; Ns: number of paging occasions for a PF; PF_offset: offset used for PF determination; UE_ID: 5G-S-TMSI mod 1024.

In some examples, parameters Ns, nAndPagingFrameOffset, nrofPDCCH-MonitoringOccasionPerSSB-InPO, and the length of default DRX Cycle may be signaled in SIB1. The values of N and PF_offset may be derived from the parameter nAndPagingFrameOffset. In some examples, the parameter first-PDCCH-MonitoringOccasionOfPO may be signaled in SIB1 for paging in initial DL BWP. For paging in a DL BWP other than the initial DL BWP, the parameter first-PDCCH-MonitoringOccasionOfPO may be signaled in the corresponding BWP configuration.

In some examples, if the UE has no 5G-S-TMSI, for instance when the UE has not yet registered onto the network, the UE may use as default identity UE_ID=0 in the PF and i_s formulas above.

In some examples, 5G-S-TMSI may be a 48 bit long bit string. 5G-S-TMSI may be in the formulae above be interpreted as a binary number where the left most bit represents the most significant bit.

In some examples, paging may allow the network to reach UEs in RRC_IDLE and in RRC_INACTIVE state through Paging messages, and to notify UEs in RRC_IDLE, RRC_INACTIVE and RRC_CONNECTED state of system information change and ETWS/CMAS indications through Short Messages. Both Paging messages and Short Messages may be addressed with P-RNTI on PDCCH, but while the former may be sent on PCCH, the latter may be sent over PDCCH directly.

In some examples, while in RRC_IDLE the UE may monitor the paging channels for CN-initiated paging; in RRC_INACTIVE the UE may also monitor paging channels for RAN-initiated paging. A UE may not need monitor paging channels continuously; Paging DRX may be defined where the UE in RRC_IDLE or RRC_INACTIVE may be required to monitor paging channels during one Paging Occasion (PO) per DRX cycle. The Paging DRX cycles may configured by the network: 1) For CN-initiated paging, a default cycle may be broadcast in system information; 2) For CN-initiated paging, a UE specific cycle may be configured via NAS signalling; 3) For RAN-initiated paging, a UE-specific cycle may be configured via RRC signalling; The UE may use the shortest of the DRX cycles applicable e.g., a UE in RRC_IDLE may use the shortest of the first two cycles above, while a UE in RRC_INACTIVE may use the shortest of the three.

In some examples, the POs of a UE for CN-initiated and RAN-initiated paging may be based on the same UE ID, resulting in overlapping POs for both. The number of different POs in a DRX cycle may be configurable via system information and a network may distribute UEs to those POs based on their IDs.

In some examples, when in RRC_CONNECTED, the UE may monitor the paging channels in a PO signaled in system information for SI change indication and PWS notification. In case of bandwidth adaptation (BA), a UE in RRC_CONNECTED may monitor paging channels on the active BWP with common search space configured.

In some examples, for operation with shared spectrum channel access, a UE may be configured for an additional number of PDCCH monitoring occasions in its PO to monitor for paging. However, when the UE detects a PDCCH transmission within the UE's PO addressed with P-RNTI, the UE may not be required to monitor the subsequent PDCCH monitoring occasions within this PO.

In some examples, the network may initiate the paging procedure by transmitting the Paging message at the UE's paging occasion. The network may address multiple UEs within a Paging message by including one PagingRecord for each UE.

In some examples, upon receiving the Paging message, if in RRC_IDLE, for each of the PagingRecord, if any, included in the Paging message: if the ue-Identity included in the PagingRecord matches the UE identity allocated by upper layers: the UE may forward the ue-Identity and accessType (if present) to the upper layers.

In some examples, if in RRC_INACTIVE, for each of the PagingRecord, if any, included in the Paging message: the ue-Identity included in the PagingRecord may match the UE's stored fullI-RNTI. If the UE is configured by upper layers with Access Identity 1: the UE may initiate the RRC connection resumption procedure with resumeCause set to mps-PriorityAccess. If the UE is configured by upper layers with Access Identity 2: the UE may initiate the RRC connection resumption procedure with resumeCause set to mcs-PriorityAccess. If the UE is configured by upper layers with one or more Access Identities equal to 11-15: the UE may initiate the RRC connection resumption procedure with resumeCause set to highPriorityAccess. Otherwise, the UE may initiate the RRC connection resumption procedure with resumeCause set to mt-Access.

Figure 18:
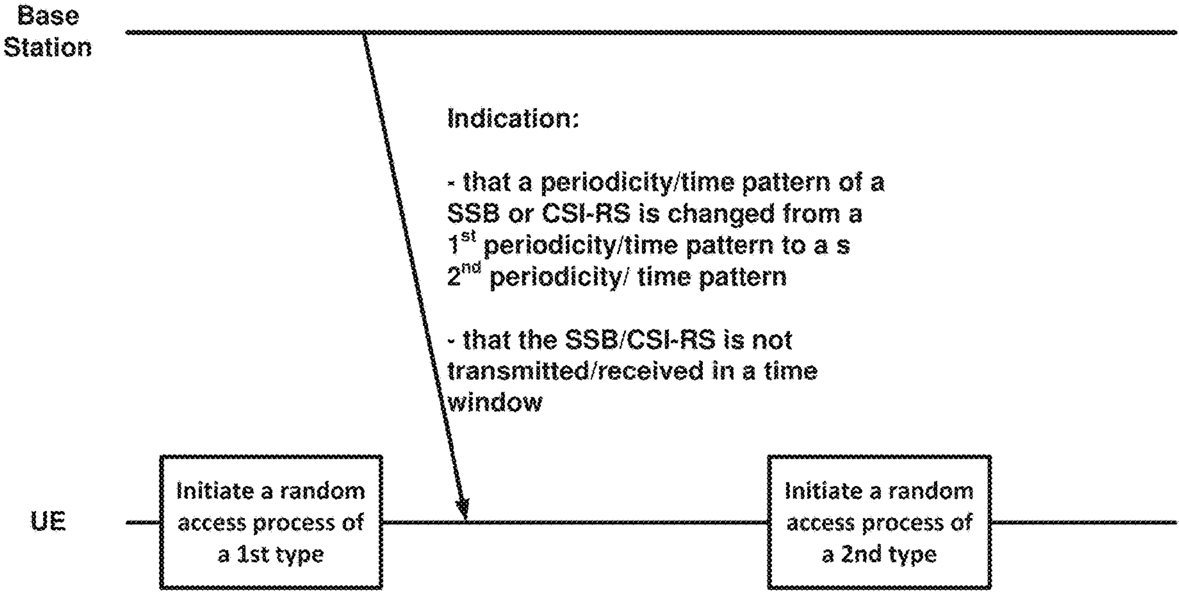
FIG. 18 shows an example Short Messages field of a paging downlink control information according to some aspects of some of various exemplary embodiments of the present disclosure.

In some examples, Short Messages may be transmitted on PDCCH using P-RNTI with or without associated Paging message using Short Message field in DCI format 1_0. An example of the Short Message is shown in FIG. 18. Bit 1 may be the most significant bit.

Example embodiments enhance MBS group notification and counting feedback from receiving UEs.

The MBS data sessions may have a wide range of durations and transmission periodicities. In some examples, some UEs may be receiving MBS data without much unicast traffic and signaling during the MBS sessions. Power saving optimization for UEs with MBS sessions may be important as the UE may be able to receive 5G MBS in all RRC states.

Figure 16:
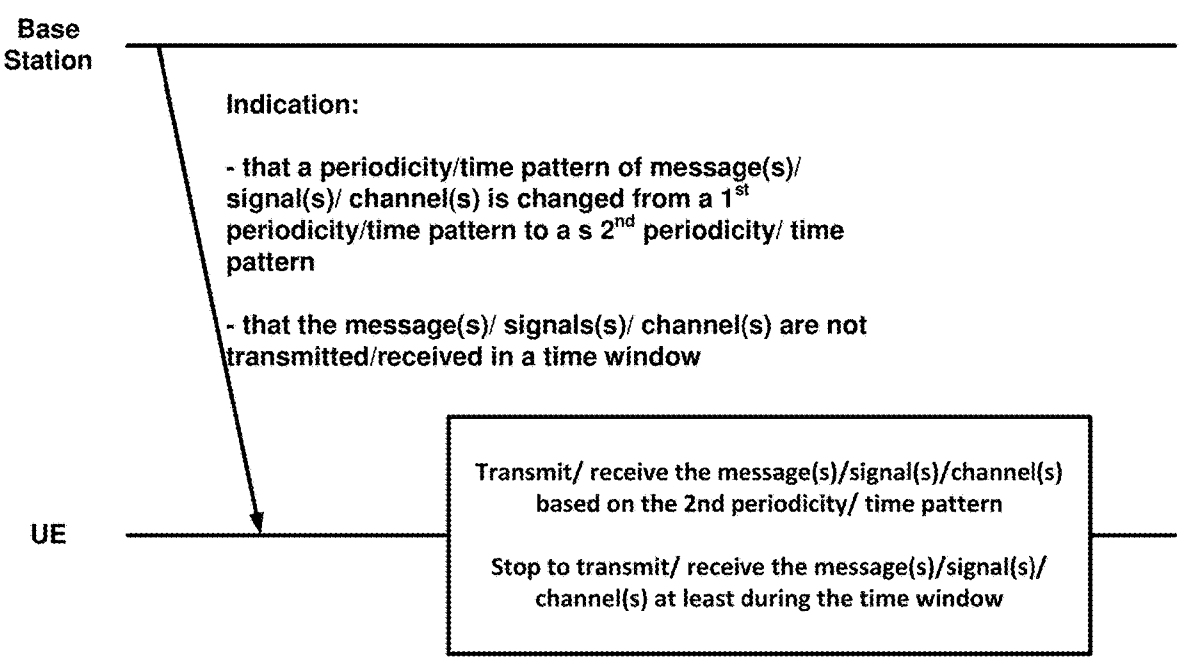
FIG. 16 shows an example MBS Group Notifications/Paging for Session Start or MBS Configuration Change according to some aspects of some of various exemplary embodiments of the present disclosure.

In this disclosure, MBS Configuration may be used to refer to MBS radio bearer and control configuration, e.g., MBS QoS, MCCH/MTCH configuration, SPS configuration, etc. The MBS Notification may be a signalling to inform UEs about an upcoming detailed MBS session/configuration change or update. In some examples, both for multicast and broadcast mode of delivery, the network may support group-based notification to inform UEs about MBS session activation/deactivation, start/end, and changes in MBS configurations before and during a session. Example MBS Group Notifications/Paging for Session Start or MBS Configuration Change is shown in FIG. 16.

In some examples, for effective delivery of MBS data, the network may determine if there are UEs receiving the data in the coverage area for each base station and beam in case of beamforming. In some examples, to ensure proper power saving for UEs receiving the MBS data the network may inform UEs about the upcoming MBS sessions and any changes in MBS configuration before and after start of an MBS session.

In some examples, for broadcast services, which UEs may receive in all RCC states, the RAN may not know the number of users receiving or interested in receiving MBS data. A framework for Polling may be used to assess interest for MBS services and determine by the RAN. The Polling may use Group Paging Message for a given MBS Service Group. In some examples, for Multicast services the RAN may keep track of users who are in the multicast group in RRC Connected state and/or if they move to in inactive state.

In some examples, MBS require group notification may be transmitted for MBS change notifications. In some examples, broadcast service continuity may require some form counting and interest indication from UEs.

In some examples, at least for broadcast services, System Information (SIB) messaging may be used to provide MBS Control configuration and MCCH type messaging to provide MBS scheduling information. In some examples, a PCCH based notification may be used for system information update which UEs would track in all RRC states.

In some examples, the MBS session may start later than when service availability is announced. In some examples, the start of session may be known and provided to the UE by upper layer signalling at the time of service or group subscription. In some examples, the start time may be determined closer to data availability in which case the UEs may be notified about the MBS session start.

In some examples, once MBS session starts, the MBS configuration may change due to various reasons such as change of MCS, periodicity, change in user distribution or traffic pattern, etc. The UEs may be informed ahead of time about such upcoming changes through group notification before they take effect.

In some examples, the network may poll the user in its coverage area to see if there are users interested in receiving an MBS service. The network may have an assessment of their presence and number to configure its transmission accordingly across cells and beams, if beamforming is used. The trigger for such UE feedback for counting may use group notification.

In some examples, a framework may be used for group MBS notification to allow the following functionalities:

A. MBS System Information Update
B. MBS Session Start/Activation or Stop/Deactivation
C. MBS Configuration Change before or during an active session
D. MBS Counting Order to Seek Interest Indication from UEs Example embodiments may be enable structuring the above information and fitting into existing control signalling, configuring and transmitting uplink feedback, and transmitting notifications to reach UEs.

In some examples, the number of UE's in the MBS group may be large and MBS notification information may be common for all member UEs. The UE specific signalling may not be scalable and efficient in most cases.

In some examples, to deliver such MBS notification to UEs in all RRC states, paging based notification may be used. The UEs is in RRC connected, inactive and idle states may monitor the paging occasions to obtain this notification information. The MBS notification may be use by core network or the RAN to reach UEs in all states and provide notifications relate to session start/end or MBS configuration changes.

In some examples, the common MBS notification framework may use paging notification capability of PCCH using DCI addressed with P-RNTI or use a separate common notification messaging e.g., with MBS-RNTI.

In some examples, unnecessary monitoring and processing of notification signalling by UEs not interested in (target) MBS services may be avoided. In some examples, the common notification signalling may be designed such that it avoids any impact on power saving of UEs' not interested in MBS services. In some examples, the common notification signalling may be designed to target specific MBS service to avoid negative impact on power saving of MBS UEs receiving other MBS service groups.

Figure 17:
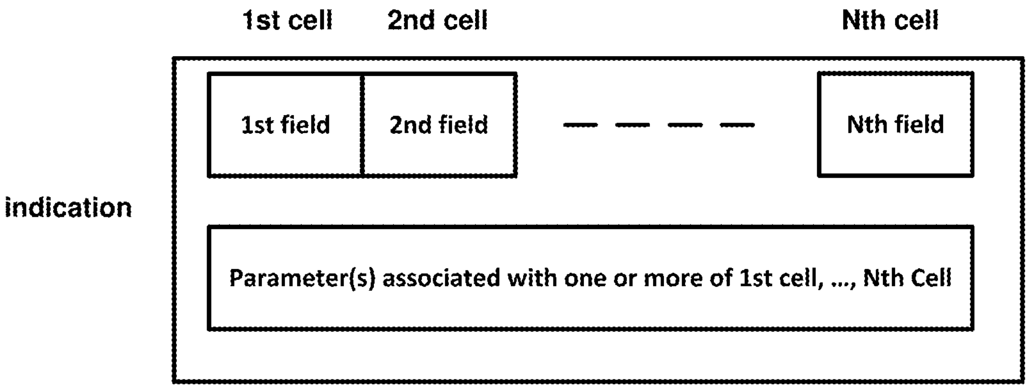
FIG. 17 shows an example Short Messages Indicator field of a paging downlink control information according to some aspects of some of various exemplary embodiments of the present disclosure.

In some examples, the PDCCH DCI format 1_0 with CRC scrambled by P_RNTI may be used to schedule paging message. The DCI may include a Short Messages Indicator-2 bits as shown in FIG. 17.

In some examples, the Short Messages may be transmitted on PDCCH using P-RNTI with or without associated Paging message using Short Message field in DCI format 1_0. An example short message field in Paging DCI is shown in FIG. 18.

In some examples, the UEs may be reacting to notifications related to systemInfoModification or etwsAndCmasIndication sent as short message field of paging DCI and process the applicable SIB messages. In some examples, for MBS SIB update only UEs who are interested in MBS may react to nonfiction and process the SIB message.

In some examples, MBS SIB update may use one of the reserved bits in the short message field of Paging Notification DCI separate from systemInfoModification or etwsAndCmasIndication, and it may be ignored by UEs not interested in MBS.

In some examples, the MBS notifications and detailed information about MBS updates may be provided in two steps. The first step may be sent as a short message field of notification DCI indicating that there is an update in some MBS sessions and in the second step provide the information about the MBS session or configuration updates/changes.

In some examples, the MBS Notification itself may be designed to target a specific MBS group or service and may differentiate between broadcast and multicast services. In some examples, it may be flexible to include trigger for various type of uplink feedback/response from UEs. Based on the required functionalities, at least some the following information may be included in the notification: Notification Type (e.g., A, B or C as described above), Target MBS service Type (e.g., Broadcast or Multicast), Target MBS Service/Group IDs, (MBS Paging ID, TMGI, etc.), Uplink Feedback/Reply (e.g., need for trigger and resource to use).

In some examples, for first step, the following options may be considered for sending the short notification.

An example embodiment for sending a short notification, may be based on one of reserved bits in short message field of Notification DCI using P-RNTI to flag any MBS Session Update and provide UEs with details of MBS Notification Type and Information for any MBS service as an IE within Paging message on PDSCH. An example of an Extended Short Message Field in Paging DCI is shown in FIG. 19.

In some examples, the notification information combinations may be RRC preconfigured and may use the few reserved bits in a paging notification massage (e.g., the 5 reserved bits), or may be included as an extension to the paging information element message or be provided in another common control signalling message following and pointed by the paging.

In an example embodiment, N reserved bits in the short message field DCI masked with PRNTI may be used to point to a row of table preconfigured by network to show different combination of Notification Types and Target MBS services while the rest of MBS Notification Information for the target MBS service as an IE within Paging message on PDSCH. An example of an Extended Short Message Field in Paging DCI is shown in FIG. 20.

In some examples, only UEs who are interested in a specific target MBS service/group may process the updated information and other UEs with other MBS services may skip the additional and unnecessary paging message processing and may save power.

Figures 21A, 21B:
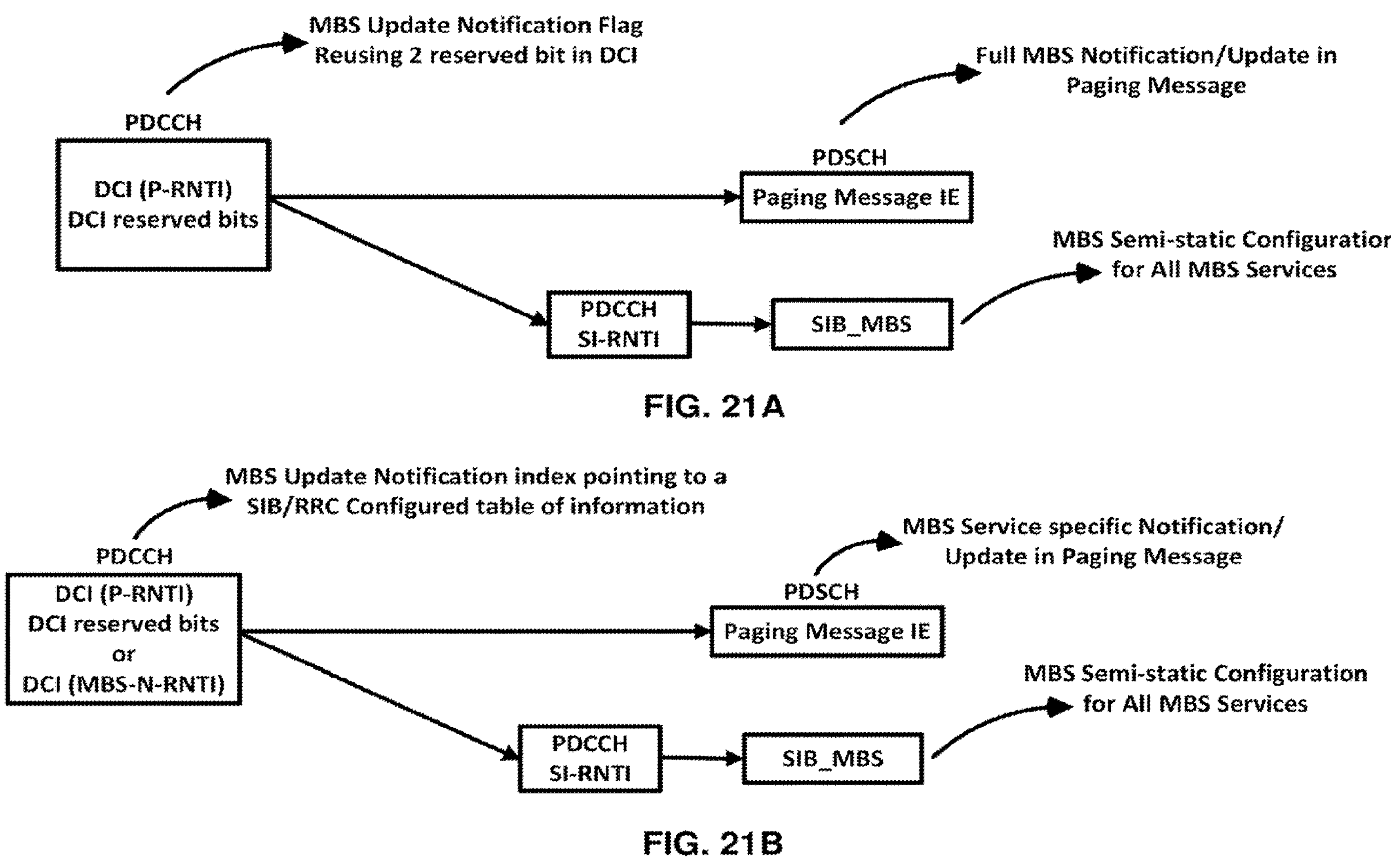
FIG. 21A shows an example 2-Step Transmission of MBS Notification and MBS Configuration/Session updates according to some aspects of some of various exemplary embodiments of the present disclosure.
FIG. 21B shows an example 2-Step Transmission of MBS Notification and MBS Configuration/Session updates according to some aspects of some of various exemplary embodiments of the present disclosure.

Example of 2-Step Transmission of MBS Notification and MBS Configuration/Session updates are shown in FIG. 21A and FIG. 21B. An example of RRC-SIB Configured Table of MBS Notification Combinations is shown in FIG. 22.

In some examples, a hybrid of the above approaches may be used to configure the MBS notification combination and send the index to row number(s) in the paging message IE.

In some examples, a PDCCH with an MBS specific MBS-N-RNTI may be used and all bits in the short message field similar to paging notification may be used to indicate different combinations.

In some examples, uplink channels such as RACH may be used to reply to notification which may require UL feedback for network triggered MBS counting notification. The example embodiments may allow selective counting triggered and UE feedback based on MBS service for selected Distributed Units or beams within a gNB.

In some examples, the RAN may selectively trigger counting for some or all MBS services in its coverage area.

The RACH resource sets associated with each MBS service group may be configured through the MBS SIB or as part of MBS Notification signaling.

In some examples, the RACH resources may be further partitioned to provide network with MBS counting applicable to different DU/beam.

In some examples, the MBS Notification for counting triggers UEs transmission on a set of RACH resources which may be identified within the MBS Notification, in the MBS update IE within Paging message or as preconfigured by RRC.

In some examples, not all the UE may need to send the counting response on the RACH as the full count may not be consequential to MBS transmission decisions and change and it may cause unnecessary uplink signaling congestion.

In some examples, transmissions on RACH for counting by the UEs may be limited based on certain rules by the network such as randomization seeds and probability calculation.

Notification signaling may be required for MBS services for example for MBS-related system information update, trigger for counting and interest indication, configuration change before and during an MBS session, etc. Existing mechanisms do not provide efficient signaling for achieving one or multiple notification purposes. Example embodiments provide a framework and enhance existing signaling mechanisms to achieve efficient MBS-related notification.

Figure 23:
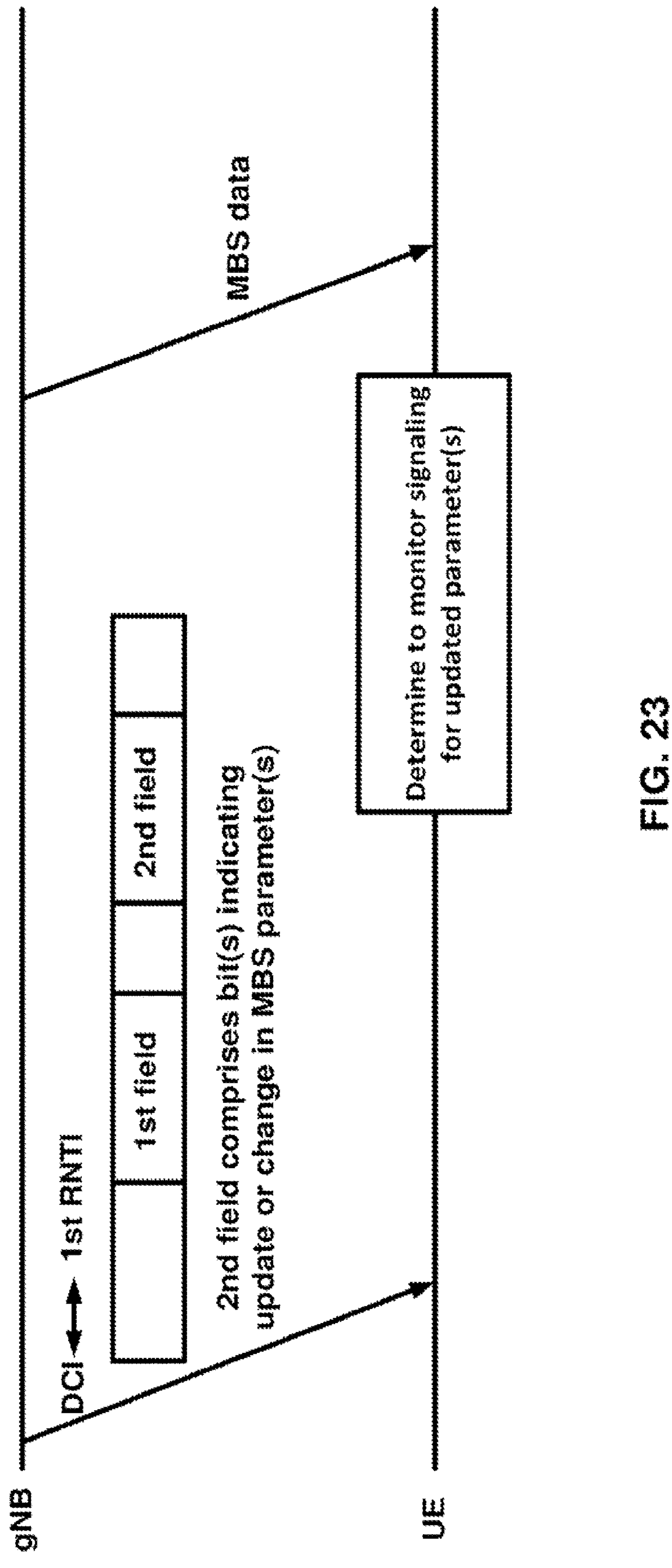
FIG. 23 shows an example process according to some aspects of some of various exemplary embodiments of the present disclosure.

In an example embodiment as shown in FIG. 23, a UE may receive a downlink control information (DCI) via a physical downlink control channel (PDCCH) based on monitoring the downlink control channel in a first monitoring occasion. In some examples, the UE may be in an RRC connected state. In some examples, the UE may be in an RRC idle/inactive state. The UE may perform a DRX procedure (for example a DRX procedure configured for an RRC connected state or a DRX procedure configured for an RRC inactive/idle state) to determine a plurality of monitoring occasions, comprising the first monitoring occasion, for control channel monitoring. For example, the UE may monitor for control channel in one or more search spaces/CORESET associated with paging and/or MBS. In an example, the DCI may be associated with paging. For example, the DCI may be used for transmission of scheduling information of a transport block to be received via a paging channel, wherein the transport block may comprise the paging information. In an example, the DCI may be used for transmission of a short message. In an example, the DCI may have a first format associated with paging.

The DCI may be associated with a first RNTI. In some examples the DCI may be a paging DCI and the first RNTI may be a paging RNTI. In some examples, the first RNTI may be an MBS RNTI. In some examples, the first RNTI may depend on whether the UE is in an RRC connected state or an RRC idle/inactive state.

The DCI may have a plurality of fields comprising a first field and a second field. The first field may be a short message indicator field comprising a plurality of bits (e.g., two bits). A first value (e.g., 01) of the short message indicator field may indicate that the presence of scheduling information for paging in the DCI (i.e., scheduling information for reception of a paging TB via a paging channel and comprising paging information). A second value (e.g., 10) of the short message indicator field may indicate a presence of a short message in the DCI. A third value of the short message indicator field may indicate presence of both of the short message and the scheduling information for paging in the DCI.

The first (short message indicator) field of the DCI may have the second value or the third value indicating that the short message is present in the DCI. The short message may be transmitted based on the second field in the DCI. The second filed may comprise a plurality of bits. One or more bits of the plurality of bits of the second field may indicate an update or a change to one or more MBS-related parameters, e.g., one or more configuration parameters (e.g., SPS configuration parameters, etc.) for MBS data reception and/or may indicate that there is an update or change to systems information associated with MBS and/or other changes or modifications.

The MBS notification, indicated by the DCI, indicates one or more of notification types (e.g., one or more of an MBS system information update/change, MBS session start/activation or stop/deactivation, MBS configuration change before or during an MBS session, MBS counting order to trigger MBS interest indication from UEs, etc.), target MBS service type (e.g., broadcast, multicast, etc.), target MBS service/Group IDs (e.g., MBS Paging ID, TMGI, etc.), Uplink Feedback/Reply (e.g., need for trigger and resources to use).

In some examples, the plurality of bits of the short message field may comprise a flag (e.g., comprising one bit) indication a presence (e.g., based on a first value (e.g., one) of the flag field) or absence (e.g., based on a second value (e.g., zero) of the flag field) of the MBS notification. In some examples, the flag field may be ignored by a non-MBS UE (e.g., a UE not interested in MBS services). In some examples, the plurality of bits of the short message field may comprise one or more second bits indicating a BCCH modification. In some examples, the plurality of bits of the short message field may comprise one or more third bits may indicate an Earthquake and Tsunami Warning System (ETWS) notification or a Commercial Mobile Alert System (CMAS) notification. In some examples, the plurality of bits of the short message filed may comprise one or more fourth bits indicating an update or a change to the MBS SIB message. The MBS SIB may, for example, indicate random access resources/preambles/occasions. In some examples, the random access resources/preambles/occasions may be beam-specific or distributed unit (DU)-specific. The random access resources/preambles/occasions may be partitioned based on their association with beams/DUs. The random access resources/preambles/occasions may be used for transmission of MBS interest indications signaling (e.g., using a random access message, such as the preamble/MsgA or Msg3). In some examples, the MBS notification may comprise an IE indicating a trigger for transmission of MBS interest signaling by the interested/MBS UEs. The UE may transmit the MBS interest indication in case the UE is interested in reception of MBS data or the UE is an MBS UE. In some examples, the transmission of MBS interest indication signaling may be based on a randomization seed or a probability (e.g., a preconfigured or configurable randomization seed or probability). In some examples, some bits of the plurality of bits of the short message field may be reserved. In some examples, the plurality of bits of the short message may be mapped to pre-configured or configurable (e.g., based on RRC signaling in the RRC Connected state or based on broadcast system information for example for the RRC idle or inactive state) combination of modifications or changes of the MBS-related parameters. In some examples, the plurality of bits of the short message field may be ignored by a non-MBS UE.

The UE may determine and/or may look for signaling associated with (e.g., that comprise and/or indicate) the changed/updated one or more MBS-related parameters in response to receiving and based on the one or more bits of the short message field. For example, based on the UE being interested in the MBS sessions corresponding to the one or more MBS-related parameters and based on receiving the DCI and the one or more bits of the short message field, the UE may receive the MBS data.

In an example embodiment, a user equipment (UE) may receive a downlink control information (DCI). The DCI may be associated with a first radio network temporary identifier (RNTI) corresponding at least to MBS-related notifications. The DCI may comprise a first field and a second field. The first field may indicate that a short message is present in the DCI. The second filed may be associated with the short message and may comprise a plurality of bits. One or more bits of the plurality of bits may indicate an update or a change to one or more MBS-related parameters. The UE may determine, based on the indication by the one or more bits, to monitor signaling indicating the updated or changed MBS-related parameters. The UE may receive MBS data based on the updated or changed MBS-related parameters.

In some examples, the receiving the downlink control information (DCI) may be based on a physical downlink control channel (PDCCH).

In some examples, the receiving of the downlink control information (DCI) may be while the user equipment (UE) is in a radio resource control (RRC) connected state.

In some examples, the receiving the downlink control information (DCI) may be while the user equipment (UE) is in a radio resource control (RRC) idle state or an RRC inactive state. In some examples, the receiving the downlink control information (DCI) may be based on monitoring a downlink control channel in a monitoring occasion determined based on a discontinuous reception (DRX) procedure in the radio resource control (RRC) idle state or the RRC inactive state.

In some examples, the first radio network temporary identifier (RNTI) may be a paging RNTI. The downlink control information (DCI) may be associated with transmission of paging information.

In some examples, the first radio network temporary identifier (RNTI) may be a multicast broadcast services (MBS)-RNTI.

In some examples, the first field may comprise one or more first bits with a first value. The first value may indicate that the short message is present in the downlink control information (DCI). In some examples, a second value of the one or more first bits may indicate that only scheduling information for paging is present in the downlink control information (DCI). In some examples, a third value of the one or more first bits may indicate that both scheduling information for paging and short message is present in the downlink control information (DCI). In some examples, the scheduling information may indicate parameters for receiving a transport block, comprising the paging information, via a paging channel.

In some examples, one or more second bits of the plurality bits may indicate a broadcast control channel (BCCH) modification.

In some examples, one or more third bits of the plurality of bits may indicate an earthquake and Tsunami Warning System (EWTS) notification or a Commercial Mobile Alert System (CMAS) notification.

In some examples, the determining to monitor signaling associated with updated or changed multicast broadcast services (MBS)-related parameters may further be based on the user equipment (UE) being an MBS UE.

In some examples, the multicast broadcast services (MBS)-related parameters may comprise semi-persistent scheduling (SPS) configuration parameters for reception of MBS data.

In some examples, a multicast broadcast services (MBS) notification, received based on the downlink control information (DCI), may indicate one or more of: a notification type; target MBS service type; target MBS Service or group identifiers (IDs); and uplink feedback or reply. In some examples, the notification type comprises at least one of: Multicast broadcast services (MBS) system information update, MBS session start/activation or MBS session stop/deactivation, MBS configuration change before or during an active session, and MBS counting order to seek interest indication. In some examples, the multicast broadcast services (MBS) service type is one of a plurality of MBS service types comprising a multicast service type and a broadcast service type. In some examples, the target multicast broadcast services (MBS) service or group identifiers (IDs) may be from a plurality of target MBS Service or group IDs comprising an MBS paging ID and a Temporary Mobile Group Identity (TMGI). In some examples, the uplink feedback or reply may comprise a need for trigger and resource to use.

In some examples, the plurality of bits may comprise a flag indicating presence of a multicast broadcast services (MBS) notification. In some examples, the flag may comprise a bit. A first value of the bit may indicate presence of the multicast broadcast services (MBS) notification. A second value of the bit may indicate an absence of the MBS notification. In some examples, the first value may be one. The second value may be zero. In some examples, the flag may be ignored by a non-multicast broadcast services (MBS) user equipment (UE).

In some examples, the plurality of bits may comprise one or more fourth bits indicating a modification of multicast broadcast services (MBS) system information block (SIB). In some examples, the multicast broadcast services (MBS) system information block (SIB) may indicate random access resources. In some examples, the random access resources may be used by the user equipment (UE) for multicast broadcast services (MBS) interest indication signaling. In some examples, the multicast broadcast services (MBS) notification may comprise an information element indicating request for MBS interest indication. The reception of the MBS notification may trigger MBS interest indication signaling by the UE. In some examples, transmission of the interest indication signaling may be based on a randomization seed or according to a probability. In some examples, the UE may receive a configuration parameter indicating the randomization seed or the probability. In some examples, the random access resources may comprise first random access resources associated with a first beam. In some examples, the random access resources may be partitioned into a plurality of random access resource sets. Each random access resource set, in the plurality of random access resource sets, may be associated with a corresponding beam or distributed unit (DU).

In some examples, the one or more bits may have one of a plurality of values. Each value in the plurality of values may be mapped to a combination of modifications or changes. In some examples, the combination of modifications or changes may be preconfigured. In some examples, the combination of modifications or changes may be configurable. In some examples, the UE may receive system information indicating the combination of modifications or changes. In some examples, the UE may receive one or more radio resource control (RRC) configuration parameters indicating the combination of modifications or changes. In some examples, the one or more bits may be ignored by a non-MBS UE.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

What is claimed is:

1. A method performed by a user equipment (UE) for multicast broadcast services (MBS), comprising:

receiving downlink control information (DCI), wherein:

the DCI is associated with a first radio network temporary identifier (RNTI) associated with MBS-related notifications, the first RNTI being different from paging-RNTI, the DCI comprises a field for a plurality of bits, and one or more bits of the plurality of bits of the field indicate an update or a change to one or more MBS-related parameters;

acquiring, based on the field, one or more updated or changed MBS-related parameters; and receiving MBS data based on the one or more updated or changed MBS-related parameters.

2. The method of claim 1, wherein receiving the DCI is based on a physical downlink control channel (PDCCH).

3. The method of claim 1, wherein receiving of the DCI occurs while the UE is in a radio resource control (RRC) connected state.

4. The method of claim 1, wherein the one or more MBS-related parameters comprise semi-persistent scheduling (SPS) configuration parameters for reception of MBS data.

5. The method of claim 1, wherein acquiring, based on the field, the one or more updated or changed MBS-related parameters comprises:

acquiring the one or more updated MBS-related parameters based on the field indicating the update to the one or more MBS-related parameters; and acquiring the one or more changed MBS-related parameters based on the field indicating the change to the one or more MBS-related parameters.

6. The method of claim 1, wherein the first RNTI is an MBS-RNTI.

7. The method of claim 1, wherein the one or more bits of the plurality of bits of the field indicate an update or a change to control channel information.

8. A user equipment (UE) for multicast broadcast services (MBS), the UE comprising one or more processors configured to:

receive downlink control information (DCI), wherein:

the DCI is associated with a first radio network temporary identifier (RNTI) associated with MBS-related notifications, the first RNTI being different from paging-RNTI, the DCI comprises a field for a plurality of bits, and one or more bits of the plurality of bits of the field indicate an update or a change to one or more MBS-related parameters;

acquire, based on the field, one or more updated or changed MBS-related parameters; and receive MBS data based on the one or more updated or changed MBS-related parameters.

9. A method for a base station for multicast broadcast services (MBS), the method comprising:

transmitting downlink control information (DCI), wherein:

the DCI is associated with a first radio network temporary identifier (RNTI) associated with MBS-related notifications, the first RNTI being different from paging-RNTI, the DCI comprises a field for a plurality of bits, one or more bits of the plurality of bits of the field indicate an update or a change to one or more MBS-related parameters, and the field is configured to be used by a user equipment (UE) to acquire one or more updated or changed MBS-related parameters; and transmitting MBS data based on the one or more updated or changed MBS-related parameters.

10. The method of claim 9, wherein the field is configured to be used by the UE to acquire the one or more updated MBS-related parameters based on the field indicating the update to the one or more MBS-related parameters, and to acquire the one or more changed MBS-related parameters based on the field indicating the change to the one or more MBS-related parameters.

11. The method of claim 9, wherein transmitting the DCI is based on a physical downlink control channel (PDCCH).

12. The method of claim 9, wherein transmitting the DCI occurs while the UE is in a radio resource control (RRC) connected state.

13. The method of claim 9, wherein the first RNTI is an MBS-RNTI.

14. The method of claim 9, wherein the one or more bits of the plurality of bits of the field indicate an update or a change to control channel information.

15. The method of claim 9, wherein the MBS-related parameters comprise semi-persistent scheduling (SPS) configuration parameters for reception of the MBS data.

16. A base station for multicast broadcast services (MBS), the base station comprising one or more processors configured to:

transmit downlink control information (DCI), wherein:

the DCI is associated with a first radio network temporary identifier (RNTI) associated with MBS-related notifications, the first RNTI being different from paging-RNTI, the DCI comprises a field for a plurality of bits, one or more bits of the plurality of bits of the field indicate an update or a change to one or more MBS-related parameters, and the field is configured to be used by a user equipment (UE) to acquire one or more updated or changed MBS-related parameters; and transmit MBS data based on the one or more updated or changed MBS-related parameters.

* * * * *